US012572682B2

(12) United States Patent      (10) Patent No.:   US 12,572,682 B2

Jain      (45) Date of Patent:    Mar. 10, 2026

(54) GENERATING A DATA PIPELINE IN AN INTERACTIVE PIPELINE SESSION UTILIZING A DEDICATED COMPUTING CLUSTER TO ACCESS SECURE DATA

(71) Applicant: Chime Financial, Inc., San Francisco, CA (US)

(72) Inventor: Akshay Jain, Boise, ID (US)

(73) Assignee: Chime Financial, Inc., San Francisco, CA (US)

( * ) Notice: Subject to any disclaimer, the term of this patent is extended or adjusted under 35 U.S.C. 154(b) by 168 days.

(21) Appl. No.: 18/643,724

(22) Filed: Apr. 23, 2024

(65) Prior Publication Data

US 2025/0328667 A1     Oct. 23, 2025

(51) Int. Cl.
    *G06F 21/62*       (2013.01)
    *H04L 9/40*       (2022.01)
(52) U.S. Cl.
    CPC ........ *G06F 21/6218* (2013.01); *H04L 63/083* (2013.01); *H04L 63/105* (2013.01)
(58) Field of Classification Search
    CPC .. G06F 21/6218; H04L 63/083; H04L 63/105
    See application file for complete search history.

(56) References Cited

U.S. PATENT DOCUMENTS

| | | | |
|---|---|---|---|
| 2019/0361697 A1* | 11/2019 | Hu | G06F 8/433 |
| 2023/0289241 A1* | 9/2023 | Gupta | G06F 9/4881 |
| 2025/0315265 A1* | 10/2025 | Gorin | H04N 21/6547 |
| 2025/0321869 A1* | 10/2025 | Bartram | G06F 11/3684 |

* cited by examiner

*Primary Examiner* — Baotran N To
(74) *Attorney, Agent, or Firm* — Keller Preece PLLC

(57) ABSTRACT

The disclosed systems provide an interactive pipeline session that provides a secure environment to generate and test a data pipeline prior to deployment, utilizing secure data that the data pipeline will utilize upon deployment. The disclosed systems generate a dedicated computing cluster based on receiving a request to initiate an interactive pipeline session within the integrated development environment and authenticate the dedicated computing cluster, which provides the dedicated computing cluster with access to secured data at a secure data source. The disclosed systems can then execute the interactive pipeline session by utilizing the dedicated computing cluster to generate a data pipeline for secure data. Additional features and advantages of one or more embodiments of the present disclosure are outlined in the description which follows, and in part will be obvious from the description, or may be learned by the practice of such example embodiments.

20 Claims, 12 Drawing Sheets

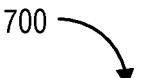

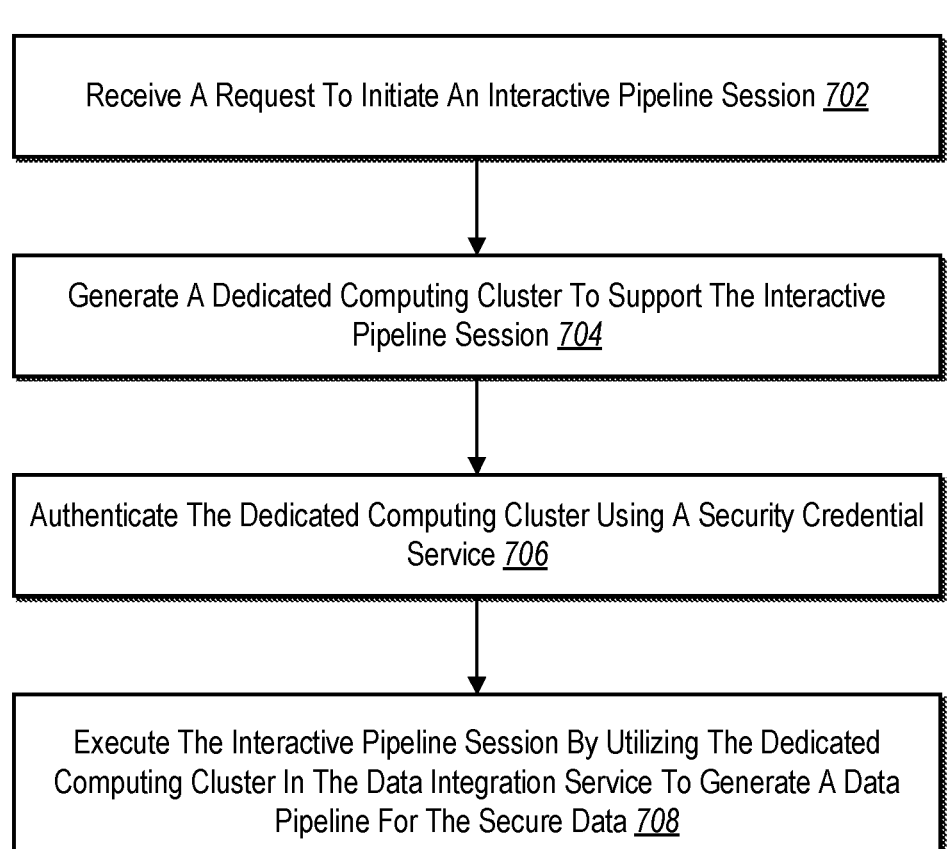

Receive A Request To Initiate An Interactive Pipeline Session _702_

Generate A Dedicated Computing Cluster To Support The Interactive Pipeline Session _704_

Authenticate The Dedicated Computing Cluster Using A Security Credential Service _706_

Execute The Interactive Pipeline Session By Utilizing The Dedicated Computing Cluster In The Data Integration Service To Generate A Data Pipeline For The Secure Data _708_

*Fig. 7*

GENERATING A DATA PIPELINE IN AN INTERACTIVE PIPELINE SESSION UTILIZING A DEDICATED COMPUTING CLUSTER TO ACCESS SECURE DATA

BACKGROUND

As recent years have seen significant improvements in the processing speed and capabilities of cloud-based and online environments, the volume of data generated and stored has also increased, and data pipelines are now a crucial component of online environments. For example, data pipelines enable online environments to handle and manage large amounts of data by collecting, processing, and moving data. To illustrate, conventional data pipelines extract data from various sources and process the data by cleaning, filtering, aggregating, or transforming it to make it usable for analysis or other purposes (e.g., to garner additional insight into the data), and loading data into a destination data source. However, even though data pipelines are a vital component of online environments, a number of problems exist in relation to generating data pipelines.

For instance, conventional data pipeline generation systems are inefficient. In order to protect sensitive data, conventional data pipeline generation systems require the local generation of the pipeline (e.g., solely on a client device), and, in some cases, only upon deployment does the data pipeline have access to the data that it will use. Without access to the data the pipeline will eventually use, issues and errors are only identified upon deployment of the pipeline, requiring the pipeline to be decommissioned while issues are identified and repaired, then deploying the data pipeline again and repeating this process until all issues are identified and repaired. A single instance of this process requires tremendous processing and computing time, but since conventional pipeline generation systems do not provide a way to identify errors and issues until the pipeline is deployed, this process is often repeated multiple times until all errors are identified, requiring sizably more processing and computing time.

In part due to their inefficiency, conventional data pipeline generation systems are inaccurate. Because, as mentioned, many conventional data pipeline generation systems do not have access to secure or sensitive data when generating data pipelines, many conventional data pipeline generation systems use mock or synthetic data to test data pipelines, leading to additional errors and/or issues upon deployment of the data pipeline. For example, since mock or synthetic data does not contain the same dependencies and permissions as data the pipeline is designed to accommodate, missing or incompatible dependencies required by the data pipeline will result in errors or issues as the data pipeline is deployed. Moreover, mock or synthetic data does not contain the same quality, integrity, or consistency as the data the pipeline will use when deployed, leading to data validation failures, errors due to malformed data, or discrepancies between the source systems used for data.

Moreover, conventional data pipeline generation systems are inflexible. As mentioned, conventional data pipeline generation systems require deploying a data pipeline to identify issues or errors when utilizing the actual secured data for the data pipeline. This is, in part, because conventional data pipeline generation systems can access only certain data sources and/or connectors for these data sources and, therefore, are unable to access multiple types of data through different types of connectors. Indeed, because conventional data pipeline generation systems can only access certain connectors, they are limited in how they can be utilized to generate data pipelines. These, along with additional problems and issues, exist with regard to conventional data pipeline generation systems.

BRIEF SUMMARY

Embodiments of the present disclosure provide benefits and/or solve one or more of the foregoing or other problems in the art with systems, non-transitory computer-readable media, and methods for generating and utilizing a dedicated computing cluster to access secure data in order to efficiently generate a data pipeline for the secure data. For example, the disclosed systems provide an interactive pipeline session that provides a secure environment to generate and test a data pipeline prior to deployment, utilizing secure data that the data pipeline will utilize upon deployment. In particular, the disclosed systems generate a dedicated computing cluster based on receiving a request to initiate an interactive pipeline session within the integrated development environment and authenticate the dedicated computing cluster, which provides the dedicated computing cluster with access to secured data at a secure data source. The disclosed systems can then execute the interactive pipeline session by utilizing the dedicated computing cluster to generate a data pipeline for secure data. Additional features and advantages of one or more embodiments of the present disclosure are outlined in the description which follows, and in part will be obvious from the description, or may be learned by the practice of such example embodiments.

BRIEF DESCRIPTION OF THE DRAWINGS

The detailed description provides one or more embodiments with additional specificity and detail through the use of the accompanying drawings, as briefly described below.

FIG. 7 illustrates a flowchart of a series of acts for generating and authenticating a dedicated computing cluster to use with an interactive pipeline session to generate a data pipeline in accordance with one or more embodiments.

DETAILED DESCRIPTION

Figure 1:
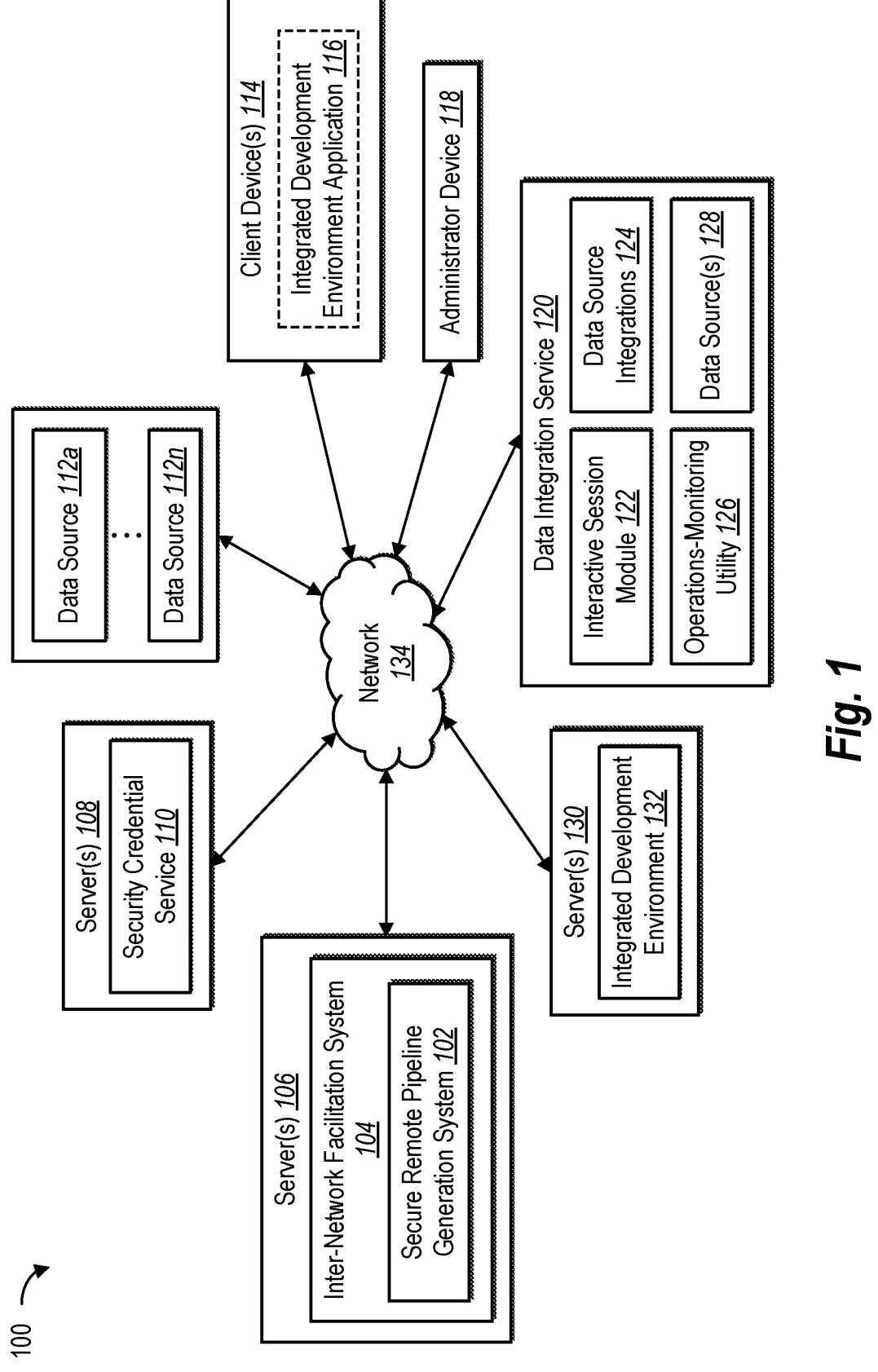
FIG. 1 illustrates a diagram of an environment in which a secure remote pipeline generation system can operate in accordance with one or more embodiments.

This disclosure describes one or more embodiments of a secure remote pipeline generation system that generates and utilizes a dedicated computing cluster to safely access secure data for generating data pipeline in an interactive pipeline session. In particular, the secure remote pipeline generation system generates the dedicated computing cluster based on a request to initiate an interactive pipeline session within an integrated development environment that is connected to a data integration service. The secure remote pipeline generation system then authenticates the dedicated computing cluster, which gives the dedicated computing cluster access to secure data stored at a secure data source. Utilizing the dedicated computing cluster, the secure remote pipeline generation system can then execute the interactive pipeline session to generate a data pipeline for the secure data.

In one or more embodiments, the secure remote pipeline generation system generates the data pipeline based on user input in the integrated development environment. In particular, the secure remote pipeline generation system receives user input of computer-executable instructions (e.g., for generating a data pipeline) in the integrated development environment and executes the interactive pipeline session by using the computer-executable instructions to generate the data pipeline. In some cases, the secure remote pipeline generation system provides populated computer-executable instructions for generating a data pipeline and generates the data pipeline based on receiving user input modifying the populated computer-executable instructions.

In one or more embodiments, the secure remote pipeline generation system utilizes a syncing utility to write data to the data integration service based upon input from the client device. In particular, as just mentioned, the secure remote pipeline generation system receives input of computer-executable instructions, and the secure remote pipeline generation system utilizes the synching utility to write the computer-executable instructions to the data integration service. In addition, the secure remote pipeline service provides renderings of data input from the client device (e.g., computer-executable instructions) during the interactive pipeline session, utilizing the syncing utility to continuously write the data to the data integration service. Upon detecting a termination of the interactive pipeline session, the secure remote pipeline generation system removes the computer-executable instructions from the client device.

As mentioned, the secure remote pipeline generation system generates and authenticates a dedicated computing cluster. In one or more embodiments, the secure remote pipeline generation system authenticates the dedicated computing cluster by providing a user authentication to a security credential service, upon which the security credential service provides the client device a secure token that provides access to a portion of the secured data during the interactive pipeline session. In some cases, the security credential service provides access to secured data based on a user role corresponding to a user account assigned to the client device in the secure data source.

In addition, in one or more embodiments, the secure remote pipeline generation system modifies a user role to update the permissions that allow the user account to access data and services. Specifically, the secure remote pipeline generation system receives a request from an administrator device to modify a user role corresponding to the user account and modifies the user role to generate an updated user role corresponding to the user account. Indeed, by updating the user role to an updated user role, the secure remote pipeline generation system grants the dedicated computing cluster the user account access credentials associated with the updated user role associated with the user account.

The secure remote pipeline generation system provides a variety of technical advantages relative to conventional systems. For example, by providing access to secured data while generating a data pipeline, the secure remote pipeline generation system improves efficiency relative to conventional systems. As previously mentioned, conventional data pipeline generation systems do not provide a means to test a data pipeline with the actual secure data it will use upon deployment, requiring multiple rounds of deploying, identifying errors, and redeploying a data pipeline. However, the secure remote pipeline generation system generates and utilizes a dedicated computing cluster that provides access to the secure data while generating the pipeline and utilizes the dedicated computing cluster during an interactive pipeline session within an integrated development environment, providing a way to test the data pipeline prior to deployment with the secured data that the data pipeline will utilize once deployed. Thus, a data pipeline generated with the secure remote pipeline generation system and tested with the secure data prior to deployment will have fewer errors and issues and, unlike conventional data pipeline generation systems, require fewer instances of deploying and decommissioning a data pipeline and greatly reducing the processing and computing requirements to generate a data pipeline.

In addition, the secure remote pipeline generation system improves accuracy relative to conventional data pipeline generation systems. As previously mentioned, since they do not have access to the secured data that a data pipeline will use when deployed, then conventional data pipeline generation systems often use mock or synthetic data to test data pipelines, leading to additional errors or issues when the data pipeline is deployed. However, since the secure remote pipeline generation system uses secure data to generate the secure pipeline as the data pipeline will use upon deployment, data pipelines generated with the secure remote pipeline generation system do not suffer from the same errors as data pipelines generated by conventional data pipeline generation systems. Specifically, they do not suffer from missing or incompatible dependencies that can result from using mock or synthetic data. Nor do the data pipelines generated by the secure remote pipeline generation system suffer from discrepancies in source systems, data validation failures, and errors due to malformed data, unlike data pipelines generated by conventional data pipeline generation systems.

The secure remote pipeline generation system also improves efficiency relative to conventional data pipeline generation systems. As previously mentioned, conventional data pipeline generation systems often cannot access secure data when generating a data pipeline because they can access only certain data sources or connectors or are unable to access multiple types or sources of data through different types of connectors. The secure remote pipeline generation system, however, can access multiple types of data and connectors. Indeed, the secure remote pipeline generation system can access data sources connected to the data integration service, which also provides options for connecting data sources through various API integrations.

As indicated by the foregoing discussion, the present disclosure utilizes a variety of terms to describe the features and advantages of the secure remote pipeline generation system. For example, as used herein, the term "inter-network facilitation system" refers to a system that, via the secure remote pipeline generation system, facilitates digital communications across different computing systems over one or more networks. For example, an inter-network facilitation system manages digital accounts, such as credit accounts, bank accounts, transaction card accounts, and secured accounts, in addition to financial information, such as funds transfers, withdrawals, deposits, and loans for one or more user profiles registered within the inter-network facilitation system. In some cases, the inter-network facilitation system is a centralized network system that includes multiple network components for facilitating access to online digital accounts via a central network location. Indeed, the inter-network facilitation system can link accounts from different network-based financial institutions to provide information regarding, and management tools for, the different accounts.

As used herein, the term "data pipeline" refers to a collection of services, tools, processes, and/or data sources that facilitate the movement and/or transformation of data between data sources. As an example, a data pipeline can include various combinations of elements to receive or access data from a data source, transform and/or analyze the data, and/or store the data in a data repository. In some cases, the data transformation system can utilize data pipelines, such as, but not limited to, real-time data pipelines, batch pipelines, extract, transform, load (ETL) pipelines, big data pipelines, and/or extract, load, transform (ELT) pipelines.

In addition, as used herein, the term "integrated development environment" refers to a computing environment that allows users to configure and arrange workflows for various computing projects. For example, an integrated development environment is a web-based (or browser-based) environment for creating and sharing documents and other computing projects containing computer-executable instructions, equations, visualizations, and narrative text. In some cases, an integrated development environment can refer to certain environments, such as Jupyter, Visual Studio, IntelliJ IDEA, Eclipse, Xcode, or PyCharm.

Moreover, as used herein, the term "interactive pipeline session" refers to a session within an integrated development environment that is connected to a data integration service in which the integrated development environment receives input from a client device to generate a data pipeline and writes the data. For example, an interactive pipeline session can be a notebook or other environment in which the client device interacts in real-time to execute computer-executable instructions, such as through creating, editing, and executing cells (e.g., code cells). In some cases, an interactive pipeline session refers to a session of an integrated development environment, during which the client device can observe output generated from computer-executable instructions and make changes based on the output. To illustrate, an interactive pipeline session can be an interactive session of a Jupyter Notebook.

Further, as used herein, the term "data integration service" refers to a software system or platform that facilitates preparing, moving, and integrating data from multiple sources. For example, a data integration service manages data from multiple sources in a centralized data catalog that facilitates creating, running, monitoring, extracting, transforming, and loading pipelines to load data (e.g., into data lakes). In addition, the data integration service is serverless (e.g., with no infrastructure to manage) and works across various workloads and with various types of users (e.g., users with different aims for their data). In some cases, the data integration service can be Amazon Web Service ("AWS") Glue, Azure Data Factory, Google Cloud Dataflow, Informatica Cloud Data Integration, Talend Data Integration, or Matallion ETL.

Also, as used herein, the term "computing cluster" refers to a set or group of computing components that work together as a single (or unified) system to execute computing tasks. For example, a computing cluster refers to components such as nodes or members that share resources, such as network storage, one (or more) networks, processing power, and memory. In some cases, a computing cluster is generated or utilized for a specific use by creating or provisioning the necessary infrastructure or resources to establish a computing cluster. As used herein, the term "dedicated computing cluster" refers to a computing cluster generated for a specific purpose. For example, a dedicated computing cluster can be generated by provisioning, creating, or allocating the necessary resources needed to complete a certain task. In some cases, a dedicated computing cluster can be generated for an interactive pipeline session (e.g., based on a request to initiate the interactive pipeline session).

In addition, as used herein, the term "security credential service" refers to a service or platform that provides systems, tools, and integrations to securely manage user identities, authentications, and access to various applications and data. For example, a security credential service can serve as a centralized platform for managing user accounts and/or use roles associated with a user account, and for controlling access to resources and enforcing security policies across various applications and systems. To illustrate, a security credential service can include Okta, Microsoft Entra, Google Identify Platform, Ping Identity, AuthO, or OneLogin. In some cases, a security credential service provides temporary security credentials. In other cases, a security credential service can provide a secure token in order to access secure data or systems.

Moreover, as used herein, the term "secure token" refers to a piece of data that represents authentication credentials or authorization information. For example, a secure token is a string of characters or data structure that is used to authenticate a user's identity or authorization and is exchanged between clients, servers, and identity providers to verify identity and grant access to secure resources, services, or data. In some cases, a secure token is used for a limited time, such as for the duration of an interactive pipeline session.

Also, as used herein, the term "secure data source" refers to a service or repository (e.g., via hardware and/or software) that manages secure data (e.g., storage of data, access to data, collection of data that comprises sensitive information therein). In some cases, a secure data source refers to a data service or data repository (e.g., via hardware and/or software) that manages data storage via cloud-based services and/or other networks (e.g., offline data stores, online data stores). To illustrate, a secure data source can include, but is not limited to, cloud computing-based data storage and/or local storage. In some cases, a secure data source can correspond to various cloud-based data service companies that facilitate the storage, movement, and access to data. For example, a secure data source can include, but is not limited to, Snowflake, Amazon S3, Kinesis Datastreams, DynamoDB Tables, or Hawker DTS Sinks.

As used herein, the term "syncing utility" refers to a software tool or program that syncs data or other files to an additional software or system. For example, a syncing utility can identify changes or updates in a software or system and write those changes to an additional software or system. Indeed, a syncing utility can seamlessly write data or other files (e.g., computer-executable instructions) to the additional software or system without manual (human) intervention. In some cases, the syncing utility begins writing data upon detecting an interactive pipeline session of an integrated development environment and writes data to an additional software or system as input is received from a client device.

In addition, as used herein, the term "operations-monitoring utility" refers to a service or system for executing computer-executable instructions. For example, an operations-monitoring utility is a service provisioning model that executes computer-executable instructions through a virtual server instance and/or various APIs. An operations-monitoring utility can execute computer-executable instructions based on a request or event and for varying scales of traffic. In some cases, an operations-monitoring utility can comprise permissions and/or rules, such as a lambda expression or function, that monitor the execution of the computer-executable instructions and will not execute the computer-executable instructions if they do not satisfy the permissions or rules. An operations-monitoring utility can be implemented by AWS Lambda, Google Cloud Functions, or Microsoft Azure.

Turning now to the figures, FIG. 1 illustrates a block diagram of a system 100 (or system environment) for implementing an inter-network facilitation system 104 and a secure remote pipeline generation system 102 in accordance with one or more embodiments. As shown in FIG. 1, system 100 includes server(s) 106 (which includes inter-network facilitation system 104 and secure remote pipeline generation system 102), server(s) 108 (which includes security credential service 110), data source(s) 112a-112n, client device(s) 114 (which includes an integrated development environment application), administrator device 118, data integration service 120 (which includes interactive session model 122, data source integrations 124, operations-monitoring utility 126, and data source(s) 128), and server(s) 130 (which includes an integrated development environment). As further illustrated in FIG. 1, the server(s) 106, server(s) 108, data source(s) 112a-112n, client device(s) 114, administrator device 118, data integration service 120, and server(s) 130 can communicate via network 134.

Although FIG. 1 illustrates the secure remote pipeline generation system 102 being implemented by a particular component and/or device within system 100, the secure remote pipeline generation system 102 can be implemented, in whole or in part, by other computing devices and/or components within the system (e.g., the client device(s) 114). Additional description regarding the illustrated computing devices (e.g., server(s) 106, computing devices implementing secure remote pipeline generation system 102, server(s) 108, client device(s) 114, and/or server(s) 130) is provided with respect to FIGS. 8 and 9 below.

As shown in FIG. 1, the server(s) 106 can include the inter-network facilitation system 104. In some embodiments, the inter-network facilitation system 104 can determine, store, generate, and/or display financial information corresponding to a user account (e.g., in a banking application or a money transfer application). Furthermore, the inter-network facilitation system 104 can also electronically communicate (or facilitate) financial transactions between one or more user accounts (and/or computing devices). Moreover, the inter-network facilitation system 104 can also track and/or monitor financial transactions and/or financial transaction behaviors of a user within a user account.

The inter-network facilitation system 104 can include a system that comprises the secure remote pipeline generation system 102, and that facilitates financial transactions and digital communications across different computing systems over one or more networks. For example, the inter-network facilitation system 104 manages credit accounts, secured accounts, and other accounts for one or more accounts registered within the inter-network facilitation system 104. In some cases, the inter-network facilitation system 104 is a centralized network system that facilitates access to online banking accounts, credit accounts, and other accounts within a central network location. Indeed, the inter-network facilitation system 104 can link accounts from different network-based financial institutions to provide information regarding, and management tools for, the different accounts.

Furthermore, as shown in FIG. 1, system 100 includes the server(s) 108 that host the security credential service 110. In one or more embodiments, the server(s) 108 and/or the security credential service 110 authenticates a dedicated computing cluster, which provides the dedicated computing cluster with access to a portion of secured data stored at a secure data source. For instance, the secure remote pipeline generation system 102 can receive, from a client device, a user authentication and provide a secure token that provides a data integration service access to a portion of the secured data during an interactive pipeline session.

As also illustrated in FIG. 1, system 100 includes data source(s) 112a-112n. In one or more embodiments, data source(s) 112a-112n can manage and/or store various data for inter-network facilitation system 104, client device(s) 114, administrator device 118, and/or data integration service 120. For instance, data source(s) 112a-112n can include various data services or data repositories (e.g., via hardware or software) that manage data storage via cloud-based services and/or other networks (e.g., offline data stores, online data stores).

Further, as illustrated in FIG. 1, system 100 includes the client device(s) 114. For example, the client device(s) 114 may include but are not limited to, mobile devices (e.g., smartphones, tablets) or other types of computing devices, including those explained below with reference to FIGS. 8 and 9. Additionally, the client device(s) 114 can include computing devices associated with (and/or operated by) user accounts for the inter-network facilitation system 104. Moreover, system 100 can include various numbers of client devices that communicate and/or interact with the inter-network facilitation system 104 and/or the secure remote pipeline generation system 102.

Furthermore, as shown in FIG. 1, the client device(s) 114 can optionally include an integrated development environment application 116. In one or more embodiments, integrated development environment application 116 can include instructions that (upon execution) cause the client device(s) 114 to perform various actions. For example, a user of a client device can interact with the integrated development environment application 116 on the client device(s) 114 to input computer-executable instructions to generate a data pipeline for secured data. Furthermore, in some cases, the integrated development environment application 116 can display one or more graphical user interfaces from which the integrated development environment and/or the secure remote pipeline generation system 102 can receive and display information regarding generating data pipelines for secure data.

In one or more embodiments, the client device(s) 114 corresponds to one or more user accounts, where a user of a client device can establish a user account with login credentials and various information corresponding to the user. For example, the client device(s) 114 can correspond to one or more user accounts for each of the inter-network facilitation system 104, the security credential service 110, the data source(s) 112a-112n, the data integration service 120, and/or the integrated development environment 132. In addition, the user accounts can include a variety of information regarding the authenticity of the client device accessing the respective system, service, or source (e.g., in order to securely access resources associated with the system, service, or source). In some instances, a user account can be accessed via multiple devices (e.g., multiple client devices) when authorized and authenticated to access the user account within the multiple devices.

As shown in FIG. 1, the system 100 also includes the administrator device 118. In one or more embodiments, the administrator device 118 may include but is not limited to, a mobile device (e.g., smartphone, tablet) or other type of computing device, including those explained below with reference to FIGS. 8 and 9. Additionally, administrator device 118 can include a computing device associated with (and/or operated by) an administrator for the inter-network facilitation system 104 and/or the data integration service 120. Moreover, system 100 can include various numbers of administrator devices that communicate and/or interact with the inter-network facilitation system 104 and/or the secure remote pipeline generation system 102. For instance, the administrator device 118 can send a request to modify a user role to an updated user role, where the user role and/or the updated user role define user account access credentials to allow the user to access data and services.

The present disclosure utilizes client device(s) 114 and/or administrator device 118 to refer to devices associated with such user accounts. In referring to a client (or user) device, the disclosure and the claims are not limited to communications with a specific device but any device corresponding to a user account and/or administrator account of a particular user. Accordingly, in using the term client device or administrator device (or client device(s) 114), this disclosure can refer to any computing device corresponding to a user account and/or administrator account of the inter-network facilitation system 104, the security credential service 110, the data source(s) 112a-112n, the data integration service 120, and/or the integrated development environment 132.

As further illustrated in FIG. 1, system 100 includes the data integration service 120. In one or more embodiments, the secure remote pipeline generation system 102 interacts with the data integration service 120 to facilitate data and provide resources to generate a data pipeline. For example, the data integration service can manage data from multiple sources (e.g., through application integrations) and can also generate a dedicated computing cluster for secure data. As shown, the data integration service includes the interactive session model 122. In one or more embodiments, the interactive session model 122 generates the dedicated computing cluster to support an interactive pipeline session in an integrated development environment. For example, based on receiving, from a client device (e.g., the client device(s) 114), a request to initiate a pipeline session within an integrated development environment, the interactive session model 122 can generate a dedicated computing cluster to support the interactive pipeline session.

As also shown, the data integration service 120 includes data source integrations 124. In one or more embodiments, data source integrations 124 comprise various integrations that connect applications and systems to communicate, exchange data, or trigger actions. For example, data source integrations 124 utilize various integrations to connect the data integration service 120 with various other applications and systems within the system. To illustrate, data source integrations can utilize various integrations to connect with and exchange data with various data sources outside the data integration service (e.g., data source 112a-112n). In some cases, data source integrations 124 offer various application programming interfaces so that data sources outside the data integration service 120 can connect with the data integration service 120.

In addition, as illustrated in FIG. 1, the data integration service 120 includes an operations-monitoring utility 126. In one or more embodiments, operations-monitoring utility 126 is a system or service that manages resources. Specifically, the operations-monitoring utility 126 is a compute service that can monitor an interactive pipeline session and execute computer-executable instructions from the pipeline session. For example, the operations-monitoring utility 126 comprises permissions and/or rules that monitor the execution of the computer-executable instructions (e.g., halting the interactive session if executing the computer-executable instructions uses more resources than allowed by the permissions).

As further illustrated in FIG. 1, the data integration service 120 includes data source(s) 128. In one or more embodiments, data source(s) 128 can manage and/or store data for inter-network facilitation system 104, client device(s) 114, administrator device 118, and/or data integration service 120. For instance, data source(s) 112a-112n can include various data services or data repositories (e.g., via hardware or software) that manage data storage via cloud-based services and/or other networks (e.g., offline data stores, online data stores).

Moreover, as illustrated in FIG. 1, system 100 includes server(s) 130 that host the integrated development environment 132. In one or more embodiments, the integrated development environment provides a computing environment for generating a data pipeline. For example, the integrated development environment can receive input from the client device (e.g., through the integrated development environment application 116) during an interactive pipeline session. In some cases, the integrated development environment is connected to the data integration service 120 (e.g., through various integrations or through a kernel) so that the integrated development environment utilizes various computing resources from the data integration service 120 (e.g., to execute computer-executable instructions).

As further shown in FIG. 1, the system 100 includes the network 134. As mentioned above, the network 134 can enable communication between components of the system 100. In one or more embodiments, network 134 may include a suitable network and may communicate using a number of communication platforms and technologies suitable for transmitting data and/or communication signals, examples of which are described with reference to FIG. 9. Furthermore, although FIG. 1 illustrates the includes server(s) 106, server(s) 108, data source(s) 112a-112n, client device(s) 114, administrator device 118, data integration service 120, and server(s) 130 communicating via the network 134, the various components of the system 100 can communicate and/or interact via other methods (e.g., the server(s) 106 and the client device(s) 114 can communicate directly).

Figure 2:
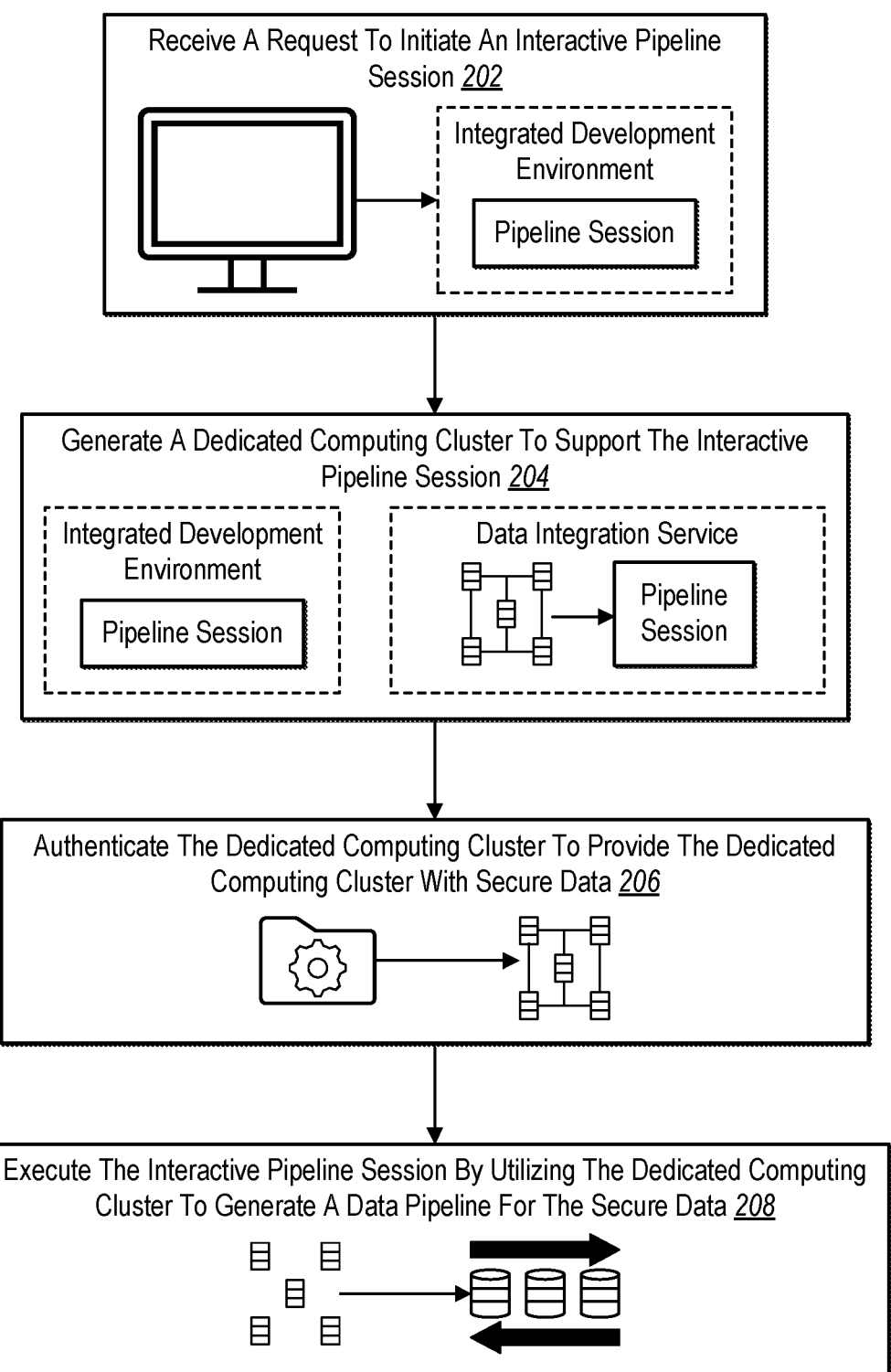
FIG. 2 illustrates an example diagram of an overview of a secure remote pipeline generation system operating in accordance with one or more embodiments.

As previously mentioned, the secure remote pipeline generation system 102 generates and utilizes a dedicated computing cluster to safely access secure data for generating data pipeline in an interactive pipeline session. Specifically, the secure remote pipeline generation system 102 authenticates the dedicated computing cluster, which provides the dedicated computing cluster with access to secure data and generates the data pipeline for the secure data. FIG. 2 illustrates an example diagram of an overview of a secure remote pipeline generation system 102 that can operate in accordance with one or more embodiments. Additional details regarding the various acts illustrated in FIG. 2 are provided thereafter, with reference to the subsequent figures.

As illustrated in FIG. 2, the secure remote pipeline generation system 102 performs an act 202 and receives a request to initiate a pipeline session. Specifically, the secure remote pipeline generation system 102 receives a request from a client device to initiate an interactive pipeline session within an integrated development environment that is connected to a data integration service. For example, the secure remote pipeline generation system 102 receives a request to initiate a pipeline session from an integrated development environment application on a client device. In some cases, the secure remote pipeline generation system 102 receives a request to initiate an interactive pipeline session based on user input of an option (e.g., a selectable option) to initiate an interactive pipeline session. In other cases, the secure remote pipeline generation system 102 receives a request to initiate an interactive pipeline session by receiving user input of computer-executable instructions that prompt the data integration service to initiate an interactive pipeline session.

As also illustrated in FIG. 2, the secure remote pipeline generation system 102 performs an act 204 and generates a dedicated computing cluster to support the interactive pipeline session. In particular, based on receiving a request to initiate an interactive pipeline session, the secure remote pipeline generation system 102 utilizes the data integration service to generate the dedicated computing cluster by provisioning computing resources for the dedicated computing cluster. For example, the data integration service can generate the dedicated computing cluster by provisioning and initializing the necessary computing components needed to generate the computing cluster for the interactive pipeline session. Additional details regarding generating the dedicated computing cluster are provided in respect to FIG. 3 below.

In one or more embodiments, the secure remote pipeline generation system 102 generates the dedicated computing cluster based on determining that the request to initiate an interactive pipeline session complies with interactive pipeline session configurations. In particular, the secure remote pipeline generation system 102 utilizes an operations-monitoring utility to determine that the request to initiate the interactive pipeline session complies with interactive pipeline session configurations and generates the dedicated computing cluster if the request complies with the pipeline session configurations. For example, if the operations-monitoring utility determines that the request to initiate the interactive pipeline session requires an amount of computing resources allowed by the pipeline session configurations, the secure remote pipeline generation system 102 will generate the dedicated computing cluster (e.g., using the data integration service). By contrast, if the operations-monitoring utility determines that the request to initiate the interactive pipeline session requires more computing resources than allowed by the pipeline session configurations, the secure remote pipeline generation system will not generate the dedicated computing cluster. Additional detail regarding the secure remote pipeline generation system 102 using an operations-monitoring utility to determine if a request to initiate an interactive pipeline session complies with pipeline session configurations will be provided with respect to FIG. 3 below.

As further shown in FIG. 2, the secure remote pipeline generation system 102 performs an act 206 and authenticates the dedicated computing cluster to provide the dedicated computing cluster with secure data. Specifically, the secure remote pipeline generation system 102 authenticates the dedicated computing cluster by providing a security credential service with a user authentication, which provides the dedicated computing cluster access to secure data during the interactive pipeline session. In one or more embodiments, the security credential service provides access to only a portion of secure data based on a user role corresponding to a user account associated with the client device. Additional details regarding access to secure data based on user role and updating a user role will be provided further with respect to FIG. 5 below.

In one or more embodiments, the security credential service provides access to secure data by providing a token to the client device for the interactive pipeline session. In particular, the security credential service can provide a secure token that interacts with a data integration credential service at the data integration service to provide access to secure data for the interactive pipeline session. For example, the secure token can be a temporary token that provides the data integration service with access to secure data stored outside the data integration service. Additional details regarding using a security credential service to provide access to secure data will be discussed further with respect to FIG. 4A-4B below.

Moreover, as illustrated in FIG. 2, the secure remote pipeline generation system 102 performs an act 208 and executes the interactive pipeline session by utilizing the dedicated computing cluster to generate a data pipeline for the secure data. Specifically, the secure remote pipeline generation system 102 can receive user input of computer-executable instructions from the client device and generate a data pipeline based on the computer-executable instructions. For example, the secure remote pipeline generation system 102 can receive the user input of computer-executable instructions within the integrated development environment on the client device. In some cases, the secure remote pipeline generation system 102 provides populated computer-executable instructions within the integrated development environment and generates the data pipeline based on receiving user input modifying the populated computer-executable instructions.

In one or more embodiments, the secure remote pipeline generation system 102 utilizes a syncing utility to write data to the data integration service during the interactive pipeline session. Specifically, the syncing utility receives user input of computer-executable instructions in the integrated development environment and writes the computer-executable instructions to the data integration service during the interactive pipeline session (e.g., so they are saved in the data integration service). Moreover, upon detecting a termination of the interactive pipeline session, the secure remote pipeline generation system 102 removes any computer-executable instructions from the client device (e.g., so secure data is not stored locally on the client device).

In addition, in one or more embodiments, the secure remote pipeline generation system 102 provides a rendering of the computer-executable instructions in the integrated development environment on the client device during the pipeline session. Specifically, the secure remote pipeline generation system 102 provides a rendering of the computer-executable instructions while writing the data corresponding to the computer-executable instructions for the data integration service. Indeed, by rendering the computer-executable instructions, the secure remote pipeline generation system 102 provides a visual environment for generating a data pipeline while securely storing the computer-executable instructions at the data integration service. Additional detail regarding the secure remote pipeline generation system 102 providing a rendering of computer executable instructions on a client device while writing data to the data integration service is provided further with respect to FIGS. 6A-6C below.

Figure 3:
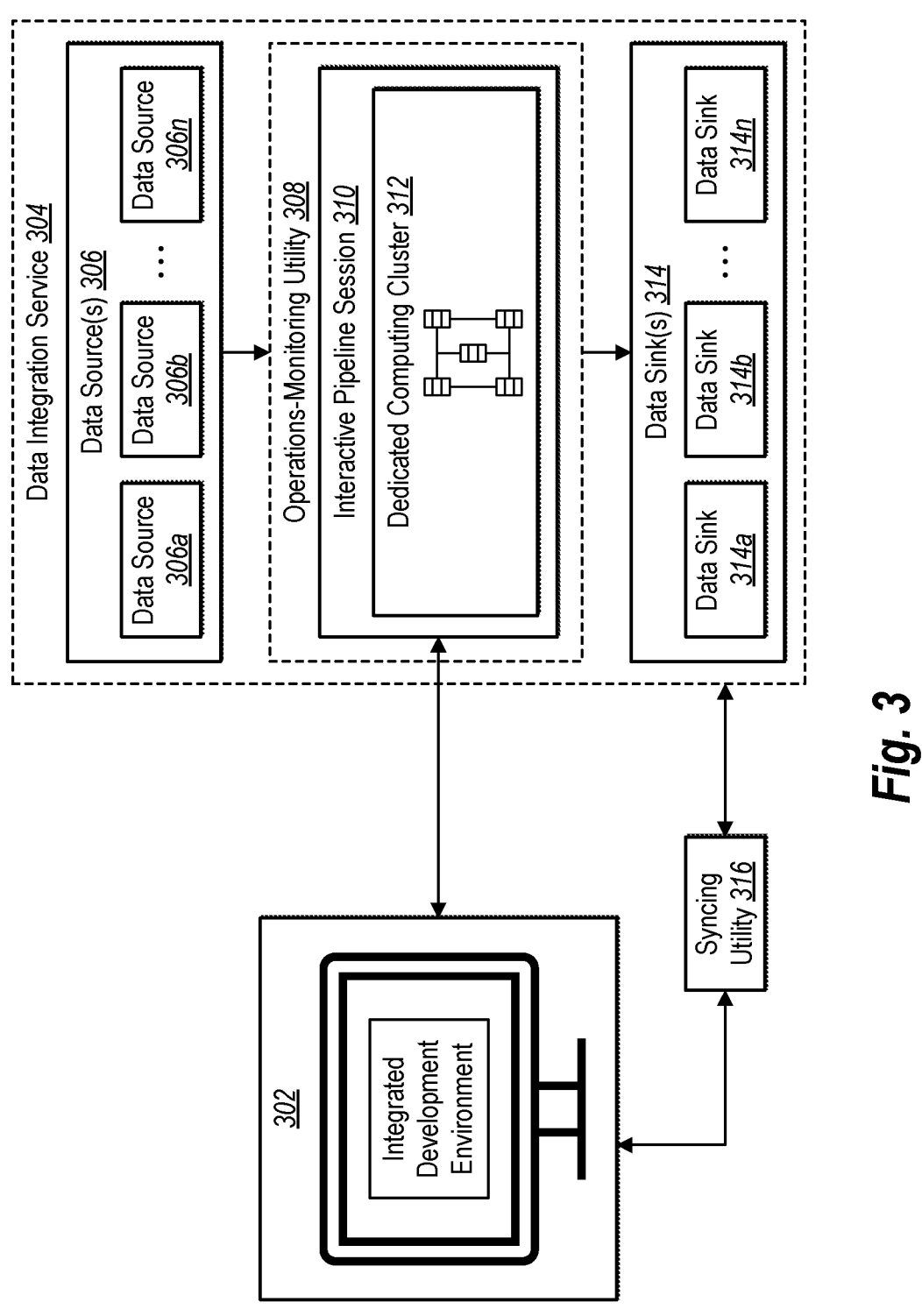
FIG. 3 illustrates a schematic diagram of a secure remote pipeline generation system utilizing an integrated development environment and a data integration service to generate a data pipeline in accordance with one or more embodiments.

As previously mentioned, the secure remote pipeline generation system 102 utilizes an integrated development environment connected to a data integration service to generate a data pipeline. In particular, the secure remote pipeline generation system 102 receives user input in an integrated development environment on a client device and writes data to a data integration service to generate a data pipeline. FIG. 3 illustrates a schematic diagram of a secure remote pipeline generation system utilizing an integrated development environment and a data integration service to generate a data pipeline in accordance with one or more embodiments.

As shown in FIG. 3, the secure remote pipeline generation system 102 comprises an integrated development environment 302. In particular, the integrated development environment 302 can include a browser-based or application-based integrated development environment in which the secure remote pipeline generation system 102 can receive input to generate and test data pipelines. Specifically, the secure remote pipeline generation system 102 can generate and test a pipeline within the integrated development environment using the secure data that the data pipeline will use upon execution. Indeed, the integrated development environment provides an interactive development and testing environment in which the secure remote pipeline generation system 102 can receive user input of computer-executable instructions to generate the data pipeline and test the pipeline using secure data.

As previously mentioned, in one or more embodiments, the secure remote pipeline generation system 102 receives, from integrated development environment 302 on a client device, a request to initiate an interactive pipeline session 310 and generates a dedicated computing cluster 312 to support the interactive pipeline session 310. Specifically, as shown in FIG. 3, the interactive pipeline session 310 can be executed or utilized by the data integration service 304, and the interactive pipeline session 310 and/or the data integration service 304 dynamically generate a temporary (short-lived) computing cluster dedicated to interactive pipeline session. For example, the secure remote pipeline generation system 102 can receive user input of parameters for the interactive pipeline session and generate (using the data integration service 304 and/or the interactive pipeline session 310) the dedicated computing cluster 312 to support the interactive pipeline session 310.

In one or more embodiments, the secure remote pipeline generation system 102 utilizes a kernel to connect the integrated development environment 302 to the data integration service 304. Specifically, the secure remote pipeline generation system 102 uses a kernel on the client device that provides access to the data integration service 304 or a specific component of the data integration service 304 (e.g., an interactive session of the data integration service). In some cases, the integrated development environment is a Jupyter notebook, the data integration service is Amazon Web Services ("AWS"), and the kernel is an open-source Jupyter kernel that integrates with AWS.

In one or more embodiments, the dedicated computing cluster generates the dedicated computing cluster 312 by provisioning the necessary infrastructure or computing resources to establish a dedicated computing cluster 312 that meets the needs of the interactive pipeline session 310. Specifically, the interactive pipeline session 310 and the dedicated computing cluster 312 are private and accessible only by the user who created them. In some cases, the interactive pipeline session 310 and the dedicated computing cluster 312 are provided through AWS Glue, where the dedicated computing cluster is an on-demand spark remote run-time cluster generated (e.g., on the fly) for the interactive pipeline session (an interactive session of AWS Glue).

In addition, in one or more embodiments, the secure remote pipeline generation system 102 generates the interactive pipeline session for a user account associated with the data integration service 304. Specifically, the secure remote pipeline generation system 102 can utilize an identity and access management service of the data integration service 304 to generate an interactive pipeline session for the user account. In some instances, the user account is associated with a user role that allows access to certain data and other resources for the interactive pipeline session. In one or more embodiments, the identity and access management service is AWS IAM Management.

As also shown in FIG. 3, the secure remote pipeline generation system 102 comprises an operations-monitoring utility 308. In one or more embodiments, the operations-monitoring utility 308 monitors requests to initiate an interactive pipeline session and determines whether to initiate the interactive pipeline session 310 based on whether a request to initiate the interactive pipeline session complies with interactive pipeline session configurations. Specifically, if the request to initiate the interactive pipeline session does not comply with interactive pipeline session configurations, the operations-monitoring utility 308 will not allow the interactive pipeline session 310 to generate the dedicated computing cluster 312. For example, a request to initiate a pipeline session may not comply with interactive pipeline session configurations if the interactive pipeline session requires a dedicated computing cluster with more computing or hardware resources than allowed by the interactive pipeline session configurations.

As also illustrated in FIG. 3, the data integration service 304 comprises data source(s) 306, which can include any number of data sources as data source locations for data in a data pipeline, shown as data source 306a, 306b, and 306n. In some cases, data source(s) 306 can be data sources within (e.g., as part of or integrated within) the data integration service 304. In other cases, data sources are outside the data integration service 304, such as third-party data sources that host or store data, and are connected to the data integration service 304 through various integrations (e.g., API integrations). Example data sources include, but are not limited to, Snowflake, Amazon S3, Streaming Plat Streams, and DynamoDB Table.

Further, as illustrated in FIG. 3, the data integration service comprises data sink(s) 314, which can include any number of data sinks as destinations for data in a data pipeline, shown as data sink 314a, 314b, and 314n. In some cases, data sink(s) 314 are located within (e.g., as part of or integrated within) the data integration service 304. In other cases, data sink(s) 314 are outside the data integration service 304 (e.g., third-party data sinks). Example data sinks include, but are not limited to, Snowflake Schema, S3 bucket, Kinesis Datastreams, Dynamo DB Table, or Hawker DTS Sink. Though illustrated separately, it is understood that data source(s) 306 and data sink(s) 314 may be located within the same system, where the data source(s) 306 are the source location and the data sink(s) 314 are the destination location for data in a data pipeline (e.g., the data pipeline generated by secure remote pipeline generation system 102).

As previously mentioned, the secure remote pipeline generation system 102 generates a data pipeline for secure data. In particular, the secure remote pipeline generation system 102 generates a secure data pipeline through interactions with the integrated development environment 302 and the data integration service 304. For example, the secure remote pipeline generation system 102 executes a session of the integrated development environment (e.g., a notebook) connected to the interactive pipeline session of the data integration service through a kernel. The secure remote pipeline generation system 102 receives user input of computer-executable instructions (e.g., code or statements) in the interactive pipeline session comprising instructions for reading data from one or more of the data source(s) 306. The secure remote pipeline generation system 102 then receives user input from the client device interacting with outputs from the computer-executable instructions and also further user input from the client device with additional computer-executable instructions comprising instructions for output for storing (or writing) the data in one or more data sink(s) 314. The secure remote pipeline generation system 102 further provides testing of the data pipeline through user interactions with the data pipeline in the integrated development environment.

As illustrated in FIG. 3, the secure remote pipeline generation system 102 also utilizes a syncing utility 316. In one or more embodiments, the syncing utility 316 is a software piece or program that syncs data or computer-executable instructions written in the integrated development environment with the data integration service. Specifically, the secure remote pipeline generation system 102 utilizes the syncing utility 316 as a custom utility that writes data written locally in the integrated development environment on the client device to the data integration service 304. Indeed, in this way, the secure remote pipeline generation system 102 can operate locally on a client device while storing and writing information to a centralized, secure system.

In one or more embodiments, the syncing utility 316 utilizes an application programming interface to connect with the data integration service 304. For example, through the application programming interface, the syncing utility sends computer-executable instructions (e.g., code and/or statements) through an application programming interface call managed by the data integration service or libraries of the data integration service running in the integrated development environment.

In addition, in one or more embodiments, the secure remote pipeline generation system 102 will display a rendering of the computer-executable instructions during the interactive pipeline session, and upon detecting termination of the interactive pipeline session, the secure remote pipeline generation system 102 will remove any remaining instructions on the client device. For example, if the client device caches or stores data as part of rendering the computer-executable instructions, the secure remote pipeline generation system 102 will remove those instructions. As another example, if the client device attempts to store computer-executable instructions or data from the data pipeline locally on the client device, the secure remote pipeline generation system 102 will remove the computer-executable instructions or data from the data pipeline from the client device.

Figure 4A:
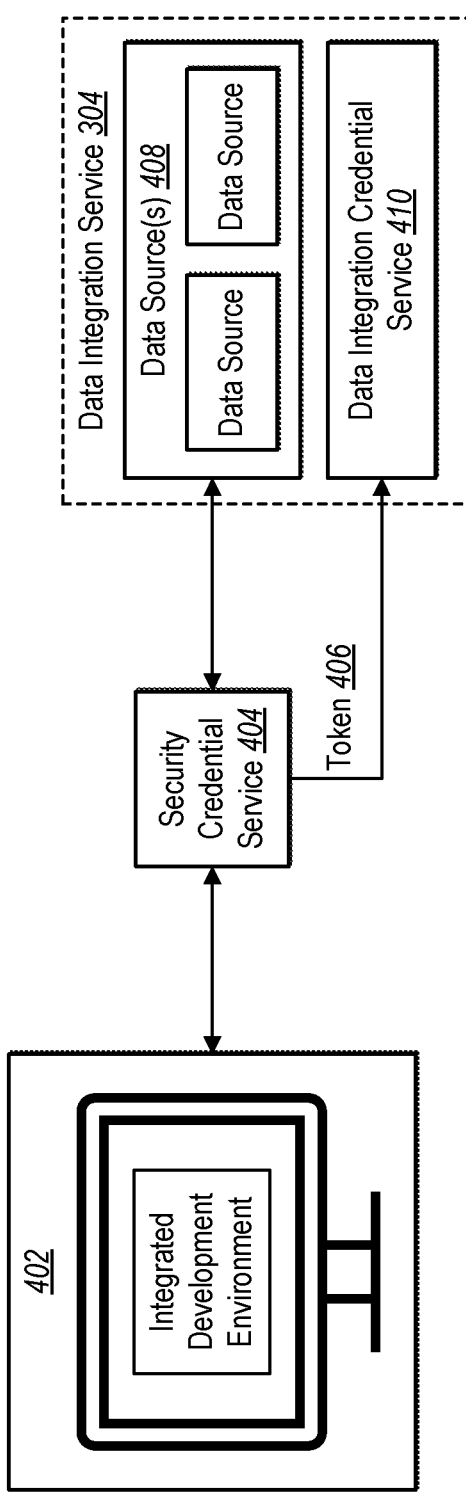
FIGS. 4A-4B illustrate a schematic diagram of a secure remote pipeline generation system utilizing a security credential service to receive a secure token to access secure data based on user account in accordance with one or more embodiments.
Figure 4B:
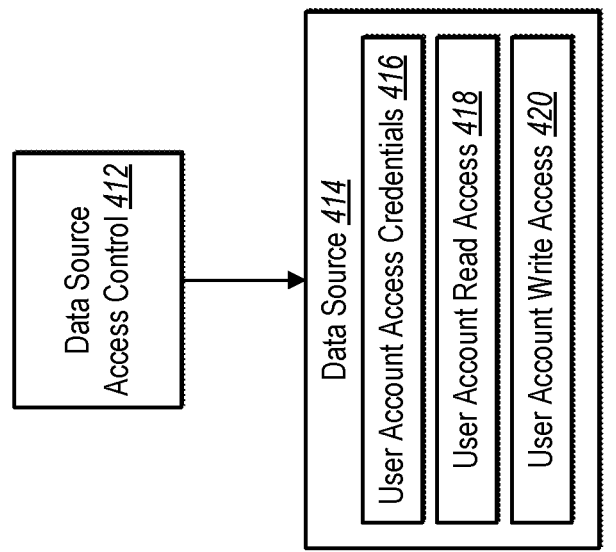

As previously mentioned, the secure remote pipeline generation system 102 authenticates the dedicated computing cluster to provide the dedicated computing cluster access to secure data. Specifically, the secure remote pipeline generation system 102 utilizes a security credential service to authenticate the dedicated computing cluster within the data integration service by providing a secure token to access secure data. FIGS. 4A-4B illustrate a schematic diagram of a secure remote pipeline generation system utilizing a security credential service to receive a secure token to access secure data based on user account in accordance with one or more embodiments. Specifically, FIG. 4A illustrates utilizing a security credential service to provide a secure token to access secure data. FIG. 4B illustrates user account access credentials to access secure data.

As shown in FIG. 4A, the integrated development environment 402 is connected to or communicates with a security credential service 404. Specifically, the security credential service 404 provides access to existing user roles within one or more data sources to provide access to secure data based on user account access credentials for the user role. For example, user account access credentials for the user role can allow access to all secure data at a data source or a portion of secure data at a data source. In some cases, the security credential service is an application connected to (or part of) an authentication server, and the security credential service 404 is connected to the data source(s) 408 through an integration that stores the authentication server details. In one or more embodiments, the security credential service 404 is an Okta OAuth application that integrates with various data sources, such as Snowflake.

As illustrated in FIG. 4A, the security credential service 404 provides a secure token 406 to data integration credential service 410. In one or more embodiments, data integration credential service 410 is a service or application of the data integration service 304 that provides secure access to data at the data integration service 304. For example, the data integration credential service 410 facilitates access to applications, services, and computing resources in the data integration service and other systems (e.g., third-party data sources) by managing, retrieving, and rotating database credentials, API keys, and other secrets. In one or more embodiments, the data integration credential service is AWS Secrets Manager.

As mentioned, the secure remote pipeline generation system 102 receives a user authentication from a client device. Specifically, the secure remote pipeline generation system 102 receives a user authentication at the security credential service 404, upon which the security credential service sends a temporary (e.g., short-lived) secure token that can be used with the data source(s) 408 to provide access to secure data. For example, the secure token 406 is configured to a user role with certain user account access credentials that are already assigned. In some cases, the secure token 406 is stored at the data integration credential service 410 and is managed at a user-specific path within the data integration credential service 410, which can only be accessed by the client device associated with the user account or a user-specific role within the data integration service. In one or more embodiments, the user role is associated with a role stored in AWS IAM for the user and the secure token is stored in a dedicated secret name for the user account at AWS Secrets Manager.

As previously mentioned, in one or more embodiments, the secure remote pipeline generation system 102 can provide access to secure data based on user role. FIG. 4B illustrates user account access credentials to access secure data.

As shown in FIG. 4B, data source access control 412 is connected to (or integrated within) a data source 414. In one or more embodiments, data source access control 412 is an integration that can connect with various other applications or systems to provide access to secure data. For example, through an API or other integration, the data integration service 304 can connect to various third-party data sources, such as data source 414, so that the data integration service can access data within the third-party data sources based on a user role associated with a user account of the data source.

As illustrated in FIG. 4B, data source 414 comprises various access permissions and controls associated with a user role of a user account. Specifically, the data source 414 can comprise different permissions and controls for various aspects of the use role associated with the user account. For instance, a user account can have user account access credentials 416 that specify permissions for accessing data, user account read access 418 that comprise permissions for reading secure data at the data source 414, and user account write access 420 for writing secure data to the data source 414.

Figure 5:
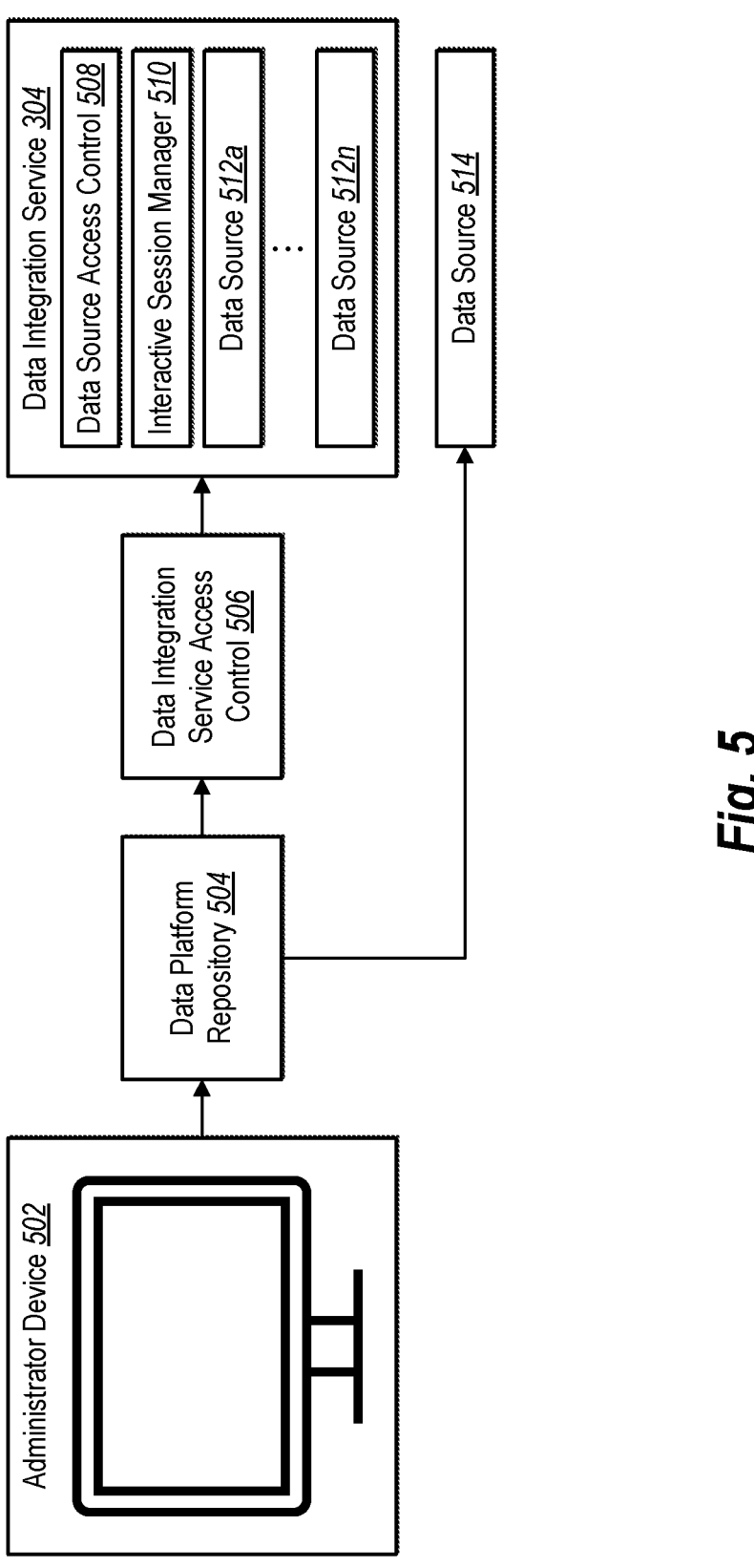
FIG. 5 illustrates a schematic diagram of a secure remote pipeline generation system updating user roles to allow a user account access to secure data and services in accordance with one or more embodiments.

As mentioned, in one or more embodiments, the secure remote pipeline generation system 102 can update a user role to an updated user role. Specifically, the secure remote pipeline generation system 102 can update a user role to provide access to different portions of secure data. FIG. 5 illustrates a schematic diagram of a secure remote pipeline generation system updating user roles to allow a user account access to secure data and services in accordance with one or more embodiments.

As shown in FIG. 5, the secure remote pipeline generation system 102 comprises an administrator device 502. In one or more embodiments, the administrator device 502 is a client device associated with a user account with permissions to update various user roles. For example, the administrator device could update user roles for the data integration service, a data source, or other components of the secure remote pipeline generation system 102.

As also illustrated, the administrator device 502 connects with the data platform repository 504. In particular, the administrator device 502 connects with the data platform repository 504 to update user-specific configurations within the data platform repository 504. In some cases, the secure remote pipeline generation system 102 comprises an automation that sends a pull request to merge computer-executable instructions for the user role within the data platform repository. In one or more embodiments, updating the user-specific configurations within the data platform repository 504 can also update the user role with a data source 514. Specifically, the data platform repository 504 is connected (e.g., through various integrations) with a data source 514 that is not housed at the data integration service, and updating the user-specific configurations within the data platform repository 504 updates the user role with the data source 514.

After updating user-specific configurations within the data platform repository, the secure remote pipeline generation system 102 can establish or update a user role within the data integration service access control 506. Specifically, secure remote pipeline generation system 102, through an administrator device, can update a user role within the data integration service access control 506 for a client principal. In one or more embodiments, a client principal makes calls from the integrated development environment to the interactive pipeline session and can utilize a user role assigned through a security credential service.

In addition to a client principal, the secure remote pipeline generation system 102 can update a user role with an execution principal in the data integration service access control. Specifically, the execution principal defines permissions for provisioning resources to generate the dedicated computing cluster. For example, the user role associated with the data integration service access control 506 is passed from the client principal to the interactive session. In some cases, along with a user role, the secure remote pipeline generation system 102 can also assign a team role for the client principal and/or the execution principal.

As shown, the data integration service access control 506 is connected to the data integration service 304, and updating the user role with the data integration service access control 506 can provide updated access to various resources and systems across the data integration service 304. Specifically, the updated user role can update access with data source access control 508, interaction session manager 510, and various data sources within the data integration service 304, such as data source(s) 512a-512n.

Figure 6A:
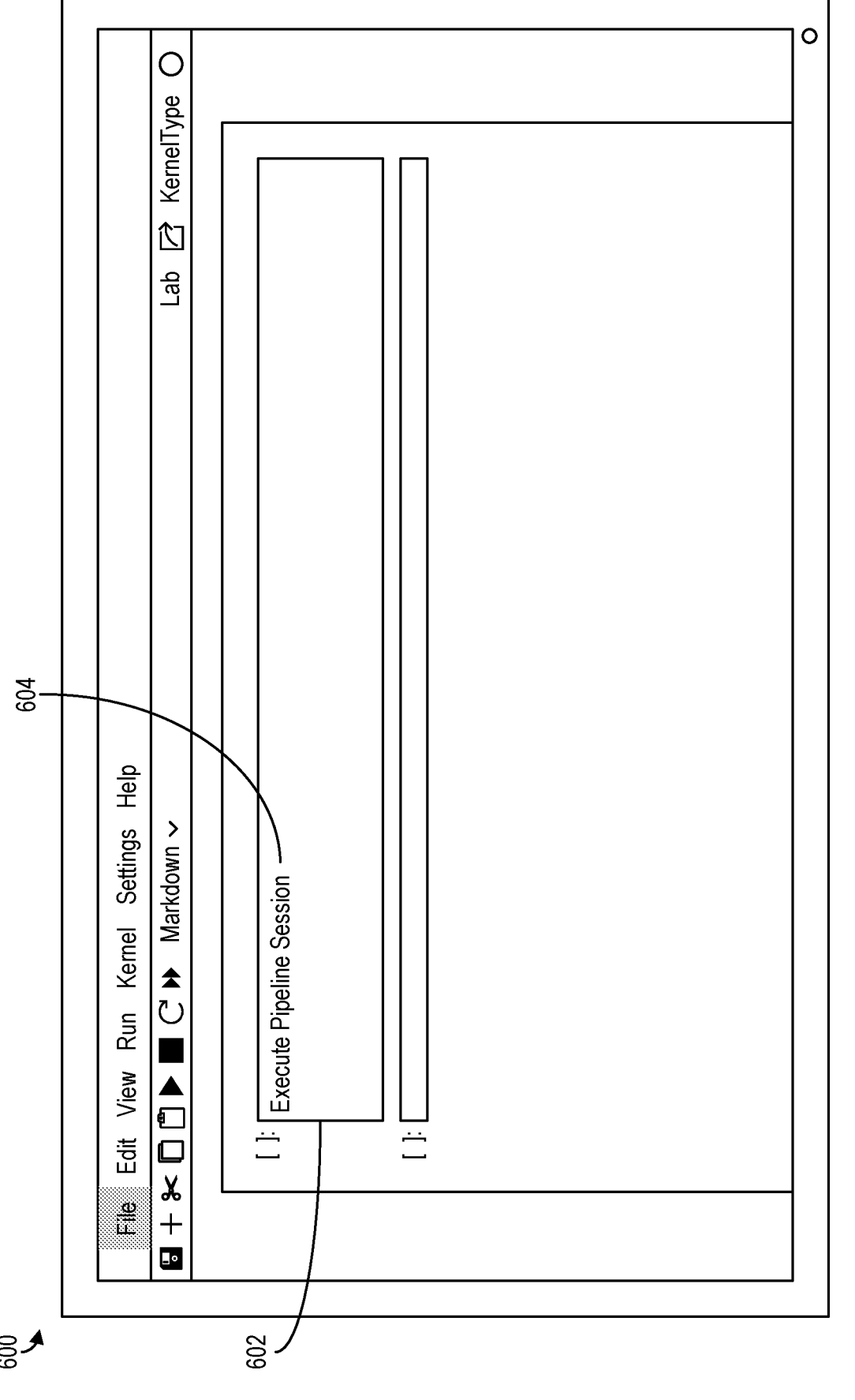
FIGS. 6A-6C illustrate example user interfaces of the secure remote pipeline generation system utilizing an integrated development environment and providing a rendering of computer-executable instructions in the integrated development environment in accordance with one or more embodiments.
Figure 6B:
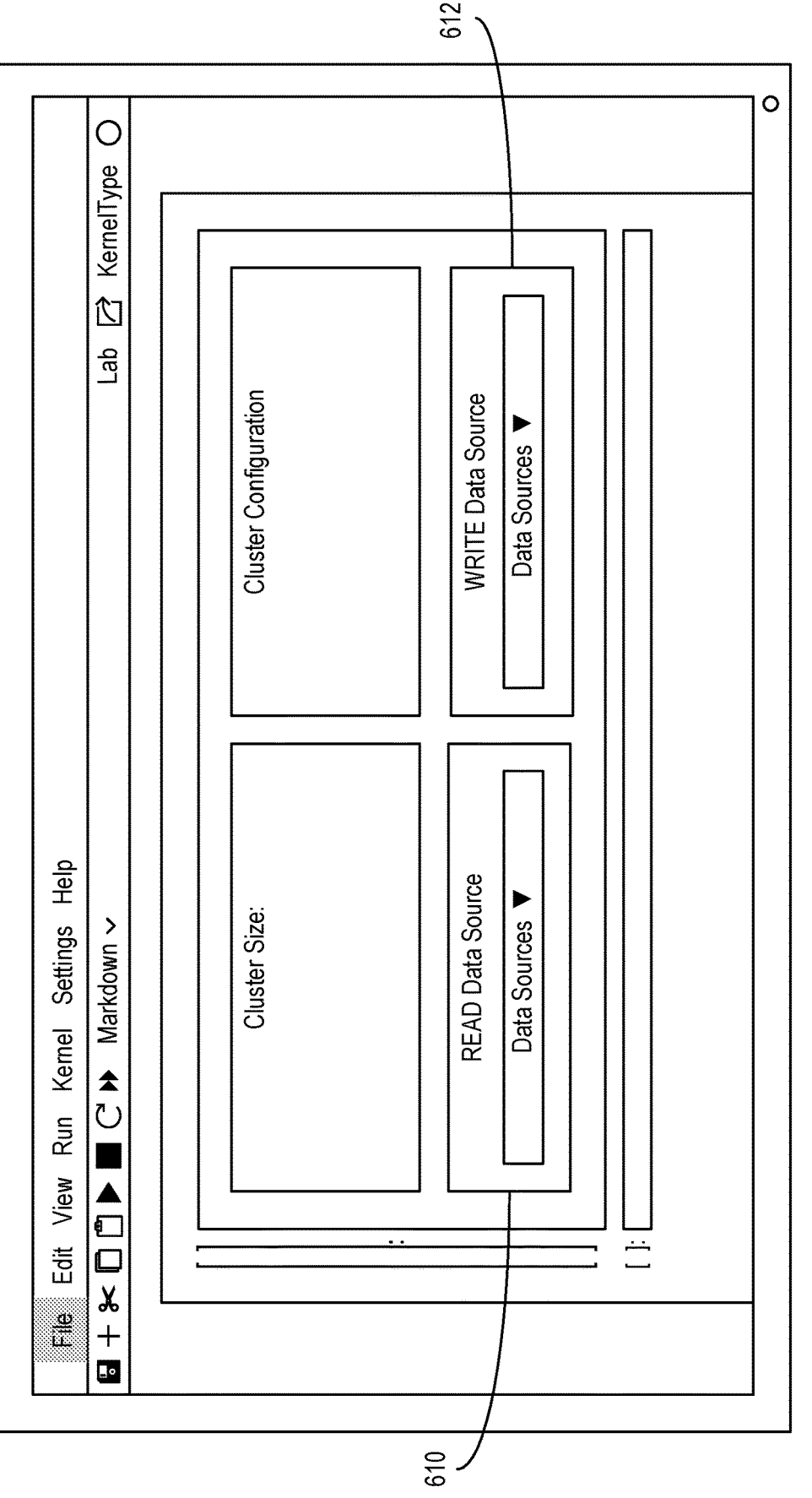
Figure 6C:
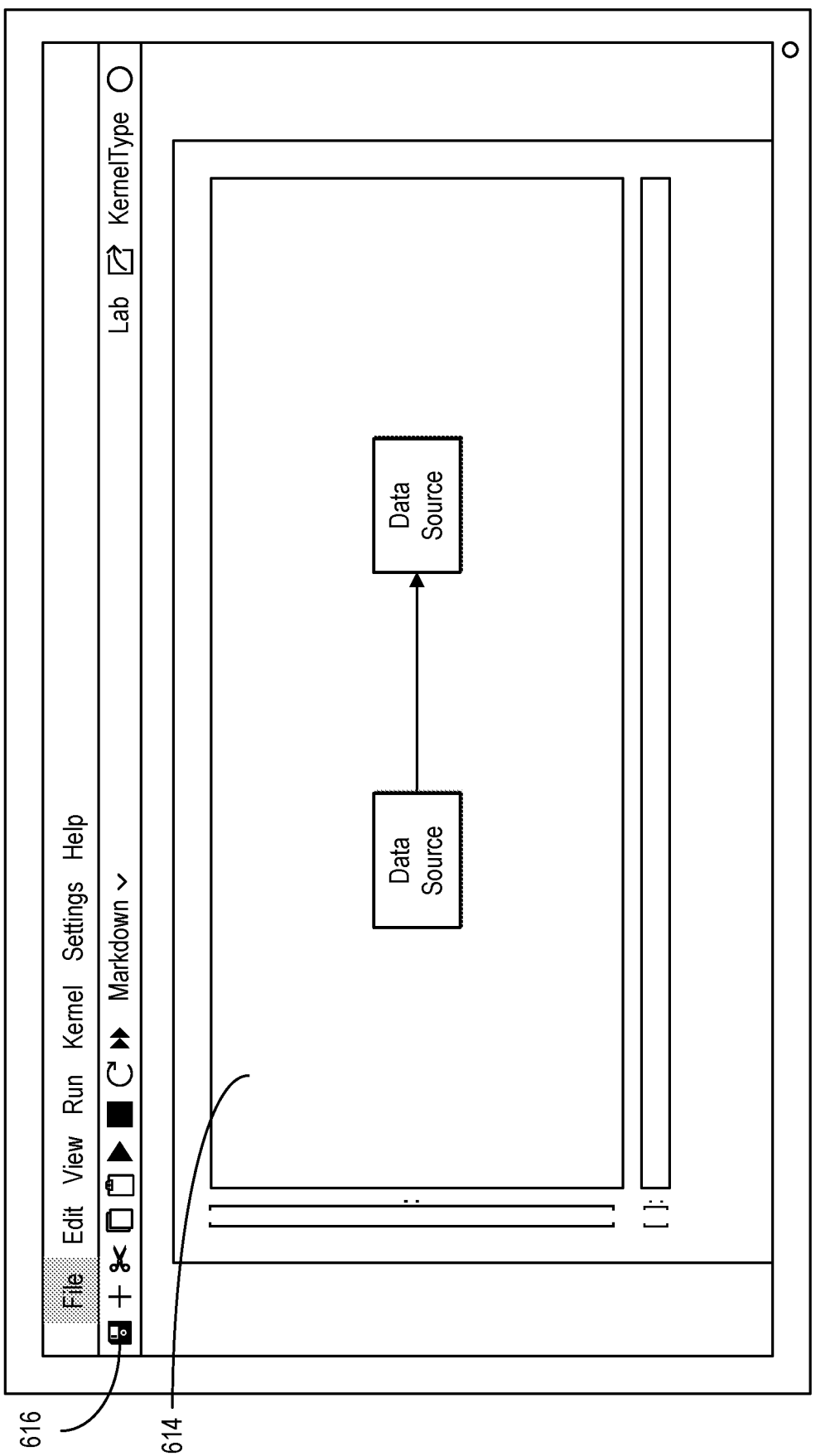

As previously mentioned, the secure remote pipeline generation system 102 utilizes an integrated development environment to receive user input to generate a data pipeline and for an interactive environment for testing the data pipeline. FIGS. 6A-6C illustrate example user interfaces of the secure remote pipeline generation system utilizing an integrated development environment and providing a rendering of computer-executable instructions in the integrated development environment in accordance with one or more embodiments. Specifically, FIG. 6A illustrates the secure remote pipeline generation system 102 receiving a request to initiate an interactive pipeline session from the interactive development environment. FIG. 6B illustrates the secure remote pipeline generation system 102 providing populated computer-executable instructions for generating a data pipeline and receiving user input to generate the data pipeline. FIG. 6C illustrates the secure remote pipeline generation system 102 providing a rendering of the computer-executable instructions and/or the data pipeline while writing the computer-executable instructions to the data integration service.

As illustrated in FIG. 6A, the integrated development environment can include a graphical user interface 600. In one or more embodiments, the graphical user interface 600 is rendered on a client device through an application of the integrated development environment. For example, the application can be installed on a client device or a browser-based application that renders a graphical user interface 600. Graphical user interface 600 can comprise one or more cells for receiving user input, such as computer-executable instructions (e.g., for generating a data pipeline). As shown, cell 602 receives user input 604 of a request to initiate an interactive pipeline session.

As illustrated in FIG. 6B, the secure remote pipeline generation system 102 can provide populated computer-executable instructions that, upon receiving user input modifying the populated computer-executable instructions, generates a data pipeline. In one or more embodiments, the secure remote pipeline generation system 102 can receive user input in a cell of a graphical user interface of the integrated development environment of selections or inputs cluster sizes or configurations. As shown, the secure remote pipeline generation system 102 can receive user input of a selection of a data source in cell 610 for source data for the data pipeline and a data sink 612 for destination data for the data pipeline.

As illustrated in FIG. 6C, the secure remote pipeline generation system 102 provides a rendering of the computer-executable instructions and other images for generating the data pipeline, even though the computer-executable instructions (and other data) are written to the data integration service. As shown, the secure remote pipeline generation system 102 displays a rendering of the data pipeline in cell 614 that makes it appear as though the secure remote pipeline generation system 102 is generating the data pipeline within the data integration environment, even though the secure remote pipeline generation system 102 is writing computer-executable instructions and data to the data integration service.

As also shown, the integrated development environment can comprise a selectable save option 616. If the secure remote pipeline generation system 102 detects computer-executable instructions or other data (e.g., cached data from rendering images) on the client device, such as from using the selectable save option 616, the secure remote pipeline generation system 102 will remove them upon terminating the interactive pipeline session. Indeed, by doing so, the secure remote pipeline generation system 102 assures that all computer-executable instructions are written to the data integration service and not saved locally on the client device.

FIGS. 1-6, the corresponding text, and the examples provide a number of different methods, systems, devices, and non-transitory computer-readable media of the secure remote pipeline generation system 102. In addition to the foregoing, one or more embodiments can also be described in terms of flowcharts comprising acts for accomplishing a particular result, as shown in FIG. 7. FIG. 7 may be performed with more or fewer acts. Further, the acts may be performed in differing orders. Additionally, the acts described herein may be repeated or performed in parallel with one another or parallel with different instances of the same or similar acts.

As mentioned, FIG. 7 illustrates a flowchart of a series of acts 700 for generating a dedicated computing cluster and executing an interactive pipeline session in accordance with one or more embodiments. While FIG. 7 illustrates acts according to one embodiment, alternative embodiments may omit, add to, reorder, and/or modify any of the acts shown in FIG. 7. The acts of FIG. 7 can be performed as part of a method. Alternatively, a non-transitory computer-readable medium can comprise instructions that, when executed by one or more processors, cause a computing device to perform the acts of FIG. 7. In some embodiments, a system can perform the acts of FIG. 7.

As shown in FIG. 7, the series of acts 700 includes an act 702 of receiving a request to initiate an interactive pipeline session, an act 704 of generating a dedicated computing cluster to support the interactive pipeline session, an act 706 of authenticating the dedicated computing cluster using a security credential service, and an act 708 of executing the interactive pipeline session by utilizing the dedicated computing cluster in the data integration service to generate a date pipeline for the secure data.

In particular, the act 702 can include receiving, from a client device, a request to initiate an interactive pipeline session within an integrated development environment that is connected to a data integration service, the act 704 can include based on the request to initiate the interactive pipeline session, generating, within the data integration service, a dedicated computing cluster to support the interactive pipeline session, the act 706 can include authenticating the dedicated computing cluster using a security credential service, wherein authenticating the dedicated computing cluster provides the dedicated computing cluster with access to secure data stored at a secure data source, and the act 708 can include executing the interactive pipeline session by utilizing the dedicated computing cluster in the data integration service to generate a data pipeline for the secure data.

For example, in one or more embodiments, the series of acts 700 includes receiving user input of computer-executable instructions from the client device in the integrated development environment and based on receiving the user input, utilizing a syncing utility to write the computer-executable instructions to the data integration service. In addition, in one or more embodiments, the series of acts 700 also includes providing, for display in the integrated development environment on the client device, a rendering of computer-executable instructions and, based on detecting a termination of the interactive pipeline session, removing the computer-executable instructions from the client device.

Further, in one or more embodiments, the series of acts 700 includes determining, by an operations-monitoring utility, that the request to initiate the interactive pipeline session complies with interactive pipeline session configuration and, based on identifying that the request to initiate the interactive pipeline session meets the interactive pipeline session configurations, generating the dedicated computing cluster for the interactive pipeline session.

Moreover, in one or more embodiments, the act 706 includes providing a user authentication from the client device to the security credential service and receiving, from the security credential service, a secure token that provides the data integration service access to a portion of the secured data during the interactive pipeline session based on a user role assigned to the client device in the secure data source.

In addition, in one or more embodiments, the series of acts 700 includes receiving, from an administrator device, a request to modify a user role corresponding with a user account associated with the client device, the user role defining user account access credentials to allow the user account to access data and services, modifying the user role to generate an updated user role associated with the user account, and wherein authenticating the dedicated computing cluster using the security credential service comprises granting the dedicated computing cluster the user account access credentials associated with the updated user role associated with the user account.

Also, in one or more embodiments, the series of acts 700 includes providing, within the integrated development environment, populated computer-executable instructions for generating the data pipeline and generating the data pipeline based on receiving user input modifying the populated computer-executable instructions. In addition, in one or more embodiments, the series of acts 700 includes receiving, from the client device, user input of computer-executable instructions in the integrated development environment and executing the interactive pipeline session by using the computer-executable instructions to generate the data pipeline for the secure data in the integrated development environment.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 8:
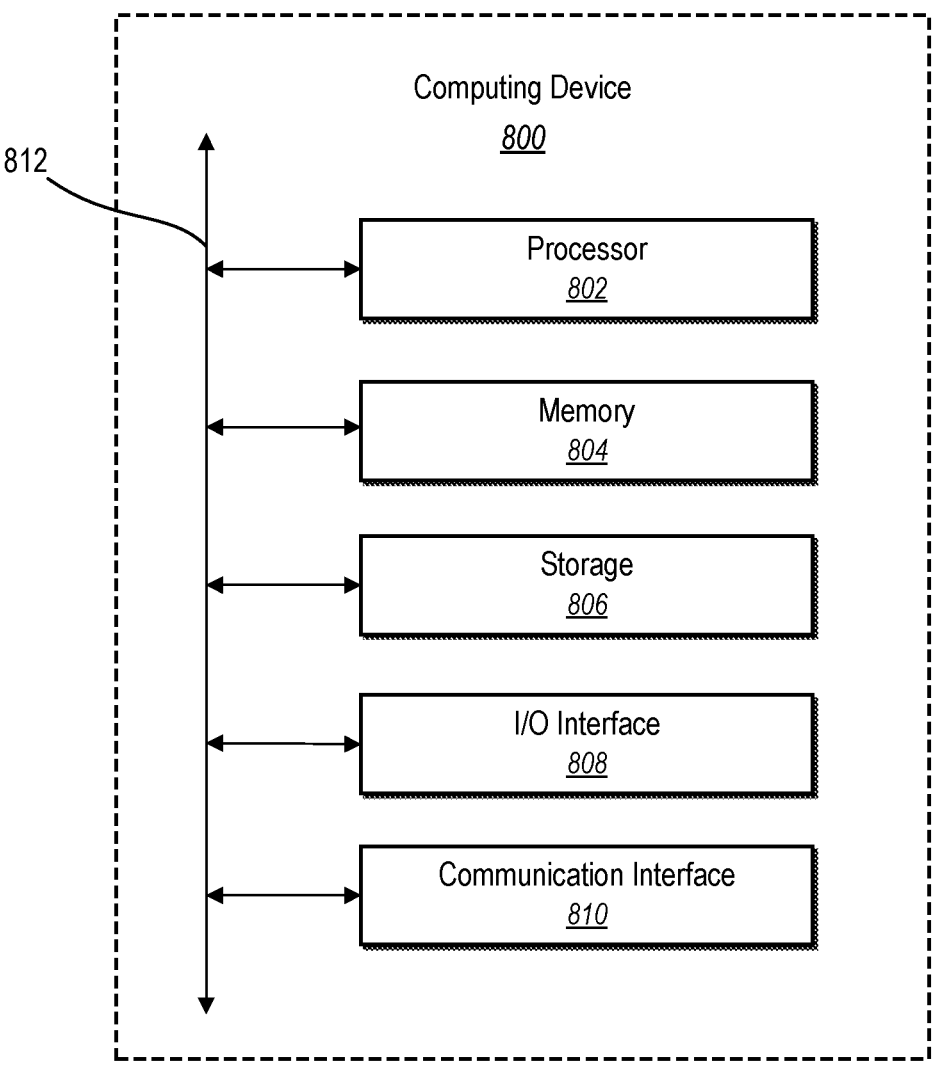
FIG. 8 illustrates a block diagram of an example computing device for implementing one or more embodiments of the present disclosure.

FIG. 8 illustrates a block diagram of an example computing device 800 that may be configured to perform one or more of the processes described above. One will appreciate that one or more computing devices, such as the computing device 800 may represent the computing devices described above (e.g., computing device 800, server(s) 106, server(s) 108, server(s) 130, client device(s) 114, and administrator device 118). In one or more embodiments, the computing device 800 may be a mobile device (e.g., a mobile telephone, a smartphone, a PDA, a tablet, a laptop, a camera, a tracker, a watch, a wearable device, etc.). In some embodiments, the computing device 800 may be a non-mobile device (e.g., a desktop computer or another type of client device). Further, the computing device 800 may be a server device that includes cloud-based processing and storage capabilities.

As shown in FIG. 8, the computing device 800 can include one or more processor(s) 802, memory 804, a storage device 806, input/output interfaces 808 (or "I/O interfaces 808"), and a communication interface 810, which may be communicatively coupled by way of a communication infrastructure (e.g., bus 812). While the computing device 800 is shown in FIG. 8, the components illustrated in FIG. 8 are not intended to be limiting. Additional or alternative components may be used in other embodiments. Furthermore, in certain embodiments, the computing device 800 includes fewer components than those shown in FIG. 8. Components of the computing device 800 shown in FIG. 8 will now be described in additional detail.

In particular embodiments, the processor(s) 802 includes hardware for executing instructions, such as those making up a computer program. As an example, and not by way of limitation, to execute instructions, the processor(s) 802 may retrieve (or fetch) the instructions from an internal register, an internal cache, memory 804, or a storage device 806 and decode and execute them.

The computing device 800 includes memory 804, which is coupled to the processor(s) 802. The memory 804 may be used for storing data, metadata, and programs for execution by the processor(s). The memory 804 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 804 may be internal or distributed memory.

The computing device 800 includes a storage device 806 includes storage for storing data or instructions. As an example, and not by way of limitation, the storage device 806 can include a non-transitory storage medium described above. The storage device 806 may include a hard disk drive (HDD), flash memory, a Universal Serial Bus (USB) drive or a combination these or other storage devices.

As shown, the computing device 800 includes one or more I/O interfaces 808, which are provided to allow a user to provide input to (such as user strokes), receive output from, and otherwise transfer data to and from the computing device 800. These I/O interfaces 808 may include a mouse, keypad or a keyboard, a touch screen, camera, optical scanner, network interface, modem, other known I/O devices or a combination of such I/O interfaces 808. The touch screen may be activated with a stylus or a finger.

The I/O interfaces 808 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 808 are configured to provide graphical data to a display for presentation to a user. The graphical data may be representative of one or more graphical user interfaces and/or any other graphical content as may serve a particular implementation.

The computing device 800 can further include a communication interface 810. The communication interface 810 can include hardware, software, or both. The communication interface 810 provides one or more interfaces for communication (such as, for example, packet-based communication) between the computing device and one or more other computing devices or one or more networks. As an example, and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI. The computing device 800 can further include a bus 812. The bus 812 can include hardware, software, or both that connects components of computing device 800 to each other.

Figure 9:
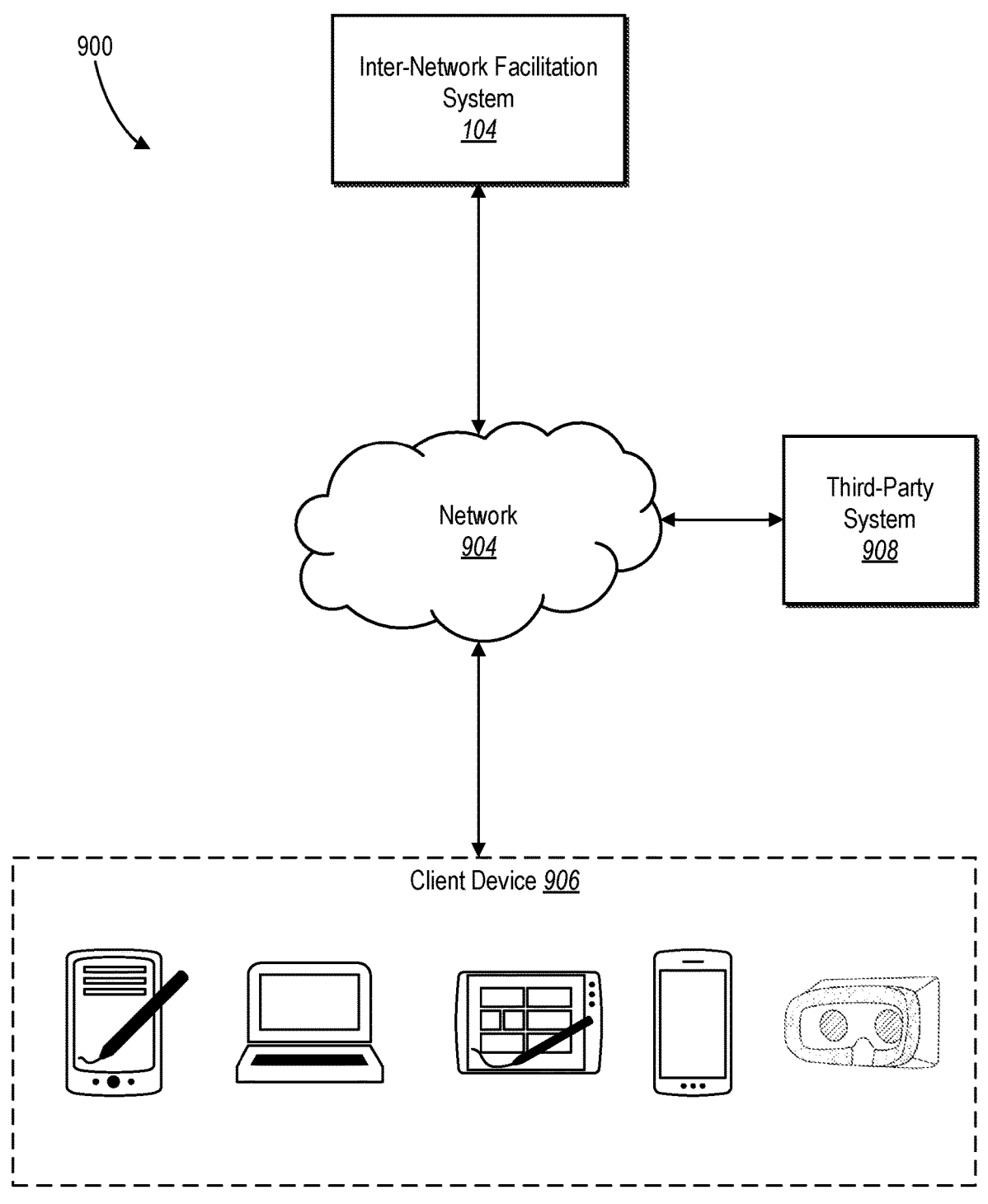
FIG. 9 illustrates an example environment for an internetwork facilitation system in accordance with one or more embodiments.

FIG. 9 illustrates an example network environment 900 of the inter-network facilitation system 104. The network environment 900 includes a client device 906 (e.g., client device(s) 114), an inter-network facilitation system 104, and a third-party system 908 connected to each other by a network 904. Although FIG. 9 illustrates a particular arrangement of the client device 906, the inter-network facilitation system 104, the third-party system 908, and the network 904, this disclosure contemplates any suitable arrangement of client device 906, the inter-network facilitation system 104, the third-party system 908, and the network 904. As an example, and not by way of limitation, two or more of client device 906, the inter-network facilitation system 104, and the third-party system 908 communicate directly, bypassing network 904. As another example, two or more of client device 906, the inter-network facilitation system 104, and the third-party system 908 may be physically or logically co-located with each other in whole or in part.

Moreover, although FIG. 9 illustrates a particular number of client devices 806, inter-network facilitation system 104, third-party systems 908, and networks 904, this disclosure contemplates any suitable number of client devices 806, third-party systems 908, and networks 904. As an example, and not by way of limitation, network environment 900 may include multiple client devices 806, inter-network facilitation system 104, third-party systems 908, and/or networks 904.

This disclosure contemplates any suitable network 904. As an example, and not by way of limitation, one or more portions of network 904 may include an ad hoc network, an intranet, an extranet, a virtual private network ("VPN"), a local area network ("LAN"), a wireless LAN ("WLAN"), a wide area network ("WAN"), a wireless WAN ("WWAN"), a metropolitan area network ("MAN"), a portion of the Internet, a portion of the Public Switched Telephone Network ("PSTN"), a cellular telephone network, or a combination of two or more of these. Network 904 may include one or more networks 904.

Links may connect client device 906, inter-network facilitation system 104 (e.g., which hosts the secure remote pipeline generation system 102), and third-party system 908 to network 904 or to each other. This disclosure contemplates any suitable links. In particular embodiments, one or more links include one or more wireline (such as for example Digital Subscriber Line ("DSL") or Data Over Cable Service Interface Specification ("DOCSIS"), wireless (such as for example Wi-Fi or Worldwide Interoperability for Microwave Access ("WiMAX"), or optical (such as for example Synchronous Optical Network ("SONET") or Synchronous Digital Hierarchy ("SDH") links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 900. One or more first links may differ in one or more respects from one or more second links.

In particular embodiments, the client device 906 may be an electronic device including hardware, software, or embedded logic components or a combination of two or more such components and capable of carrying out the appropriate functionalities implemented or supported by client device 906. As an example, and not by way of limitation, a client device 906 may include any of the computing devices discussed above in relation to FIG. 7. A client device 906 may enable a network user at the client device 906 to access network 904. A client device 906 may enable its user to communicate with other users at other client devices 806.

In particular embodiments, the client device 906 may include a requester application or a web browser, such as MICROSOFT INTERNET EXPLORER, GOOGLE CHROME, or MOZILLA FIREFOX, and may have one or more add-ons, plug-ins, or other extensions, such as TOOL-BAR or YAHOO TOOLBAR. A user at the client device 906 may enter a Uniform Resource Locator ("URL") or other address directing the web browser to a particular server (such as server), and the web browser may generate a Hyper Text Transfer Protocol ("HTTP") request and communicate the HTTP request to server. The server may accept the HTTP request and communicate to the client device 906 one or more Hyper Text Markup Language ("HTML") files responsive to the HTTP request. The client device 906 may render a webpage based on the HTML files from the server for presentation to the user. This disclosure contemplates any suitable webpage files. As an example, and not by way of limitation, webpages may render from HTML files, Extensible Hyper Text Markup Language ("XHTML") files, or Extensible Markup Language ("XML") files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, inter-network facilitation system 104 may be a network-addressable computing system that can interface between two or more computing networks or servers associated with different entities such as financial institutions (e.g., banks, credit processing systems, ATM systems, or others). In particular, the inter-network facilitation system 104 can send and receive network communications (e.g., via the network 904) to link the third-party-system 908. For example, the inter-network facilitation system 104 may receive authentication credentials from a user to link a third-party system 908 such as an online bank account, credit account, debit account, or other financial account to a user account within the inter-network facilitation system 104. The inter-network facilitation system 104 can subsequently communicate with the third-party system 908 to detect or identify balances, transactions, withdrawal, transfers, deposits, credits, debits, or other transaction types associated with the third-party system 908. The inter-network facilitation system 104 can further provide the aforementioned or other financial information associated with the third-party system 908 for display via the client device 906. In some cases, the inter-network facilitation system 104 links more than one third-party system 908, receiving account information for accounts associated with each respective third-party system 908 and performing operations or transactions between the different systems via authorized network connections.

In particular embodiments, the inter-network facilitation system 104 may interface between an online banking system and a credit processing system via the network 904. For example, the inter-network facilitation system 104 can provide access to a bank account of a third-party system 908 and linked to a user account within the inter-network facilitation system 104. Indeed, the inter-network facilitation system 104 can facilitate access to, and transactions to and from, the bank account of the third-party system 908 via a client application of the inter-network facilitation system 104 on the client device 906. The inter-network facilitation system 104 can also communicate with a credit processing system, an ATM system, and/or other financial systems (e.g., via the network 904) to authorize and process credit charges to a credit account, perform ATM transactions, perform transfers (or other transactions) across accounts of different third-party systems 908, and to present corresponding information via the client device 906.

In particular embodiments, the inter-network facilitation system 104 includes a model for approving or denying transactions. For example, the inter-network facilitation system 104 includes a transaction approval machine learning model that is trained based on training data such as user account information (e.g., name, age, location, and/or income), account information (e.g., current balance, average balance, maximum balance, and/or minimum balance), credit usage, and/or other transaction history. Based on one or more of these data (from the inter-network facilitation system 104 and/or one or more third-party systems 908), the inter-network facilitation system 104 can utilize the transaction approval machine learning model to generate a prediction (e.g., a percentage likelihood) of approval or denial of a transaction (e.g., a withdrawal, a transfer, or a purchase) across one or more networked systems.

The inter-network facilitation system 104 may be accessed by the other components of network environment 900 either directly or via network 904. In particular embodiments, the inter-network facilitation system 104 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by the server. In particular embodiments, the inter-network facilitation system 104 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a client device 906, or an inter-network facilitation system 104 to manage, retrieve, modify, add, or delete, the information stored in a data store.

In particular embodiments, the inter-network facilitation system 104 may provide users with the ability to take actions on various types of items or objects, supported by the inter-network facilitation system 104. As an example, and not by way of limitation, the items and objects may include financial institution networks for banking, credit processing, or other transactions, to which users of the inter-network facilitation system 104 may belong, computer-based applications that a user may use, transactions, interactions that a user may perform, or other suitable items or objects. A user may interact with anything that is capable of being represented in the inter-network facilitation system 104 or by an external system of a third-party system, which is separate from inter-network facilitation system 104 and coupled to the inter-network facilitation system 104 via a network 904.

In particular embodiments, the inter-network facilitation system 104 may be capable of linking a variety of entities. As an example, and not by way of limitation, the inter-network facilitation system 104 may enable users to interact with each other or other entities, or to allow users to interact with these entities through an application programming interfaces ("API") or other communication channels.

In particular embodiments, the inter-network facilitation system 104 may include a variety of servers, sub-systems, programs, modules, logs, and data stores. In particular embodiments, the inter-network facilitation system 104 may include one or more of the following: a web server, action logger, API-request server, transaction engine, cross-institution network interface manager, notification controller, action log, third-party-content-object-exposure log, inference module, authorization/privacy server, search module, user-interface module, user-profile (e.g., provider profile or requester profile) store, connection store, third-party content store, or location store. The inter-network facilitation system 104 may also include suitable components such as network interfaces, security mechanisms, load balancers, failover servers, management-and-network-operations consoles, other suitable components, or any suitable combination thereof. In particular embodiments, the inter-network facilitation system 104 may include one or more user-profile stores for storing user profiles for transportation providers and/or transportation requesters. A user profile may include, for example, biographic information, demographic information, financial information, behavioral information, social information, or other types of descriptive information, such as interests, affinities, or location.

The web server may include a mail server or other messaging functionality for receiving and routing messages between the inter-network facilitation system 104 and one or more client devices 806. An action logger may be used to receive communications from a web server about a user's actions on or off the inter-network facilitation system 104. In conjunction with the action log, a third-party-content-object log may be maintained of user exposures to third-party-content objects. A notification controller may provide information regarding content objects to a client device 906. Information may be pushed to a client device 906 as notifications, or information may be pulled from client device 906 responsive to a request received from client device 906. Authorization servers may be used to enforce one or more privacy settings of the users of the inter-network facilitation system 104. A privacy setting of a user determines how particular information associated with a user can be shared. The authorization server may allow users to opt in to or opt out of having their actions logged by the inter-network facilitation system 104 or shared with other systems, such as, for example, by setting appropriate privacy settings. Third-party-content-object stores may be used to store content objects received from third parties. Location stores may be used for storing location information received from client devices 806 associated with users.

In addition, the third-party system 908 can include one or more computing devices, servers, or sub-networks associated with internet banks, central banks, commercial banks, retail banks, credit processors, credit issuers, ATM systems, credit unions, loan associates, brokerage firms, linked to the inter-network facilitation system 104 via the network 904. A third-party system 908 can communicate with the inter-network facilitation system 104 to provide financial information pertaining to balances, transactions, and other information, whereupon the inter-network facilitation system 104 can provide corresponding information for display via the client device 906. In particular embodiments, a third-party system 908 communicates with the inter-network facilitation system 104 to update account balances, transaction histories, credit usage, and other internal information of the inter-network facilitation system 104 and/or the third-party system 908 based on user interaction with the inter-network facilitation system 104 (e.g., via the client device 906). Indeed, the inter-network facilitation system 104 can synchronize information across one or more third-party systems 908 to reflect accurate account information (e.g., balances, transactions, etc.) across one or more networked systems, including instances where a transaction (e.g., a transfer) from one third-party system 908 affects another third-party system 908.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A computer-implemented method comprising:

receiving, from a client device, a request to initiate an interactive pipeline session within an integrated development environment that is connected to a data integration service;

based on the request to initiate the interactive pipeline session, generating, within the data integration service, a dedicated computing cluster to support the interactive pipeline session;

authenticating the dedicated computing cluster using a security credential service, wherein authenticating the dedicated computing cluster provides the dedicated computing cluster with access to secure data stored at a secure data source; and executing the interactive pipeline session by utilizing the dedicated computing cluster in the data integration service to generate a data pipeline for the secure data.

2. The computer-implemented method of claim 1, further comprising:

receiving user input of computer-executable instructions from the client device in the integrated development environment; and based on receiving the user input, utilizing a syncing utility to write the computer-executable instructions to the data integration service.

3. The computer-implemented method of claim 2, further comprising:

providing, for display in the integrated development environment on the client device, a rendering of computer-executable instructions; and based on detecting a termination of the interactive pipeline session, removing the computer-executable instructions from the client device.

4. The computer-implemented method of claim 1, further comprising:

determining, by an operations-monitoring utility, that the request to initiate the interactive pipeline session complies with interactive pipeline session configurations; and based on identifying that the request to initiate the interactive pipeline session meets the interactive pipeline session configurations, generating the dedicated computing cluster for the interactive pipeline session.

5. The computer-implemented method of claim 1, wherein authenticating the dedicated computing cluster using the security credential service further comprises:

providing a user authentication from the client device to the security credential service; and receiving, from the security credential service, a secure token that provides the data integration service access to a portion of the secured data during the interactive pipeline session based on a user role corresponding to a user account associated with the client device in the secure data source.

6. The computer-implemented method of claim 1, further comprising:

receiving, from an administrator device, a request to modify a user role corresponding to a user account associated with the client device, the user role defining user account access credentials to allow the user account to access data and services;

modifying the user role to generate an updated user role corresponding to the user account; and wherein authenticating the dedicated computing cluster using the security credential service comprises granting the dedicated computing cluster the user account access credentials associated with the updated user role associated with the user account.

7. The computer-implemented method of claim 1, wherein executing the interactive pipeline session further comprises:

providing, within the integrated development environment, populated computer-executable instructions for generating the data pipeline; and generating the data pipeline based on receiving user input modifying the populated computer-executable instructions.

8. The computer-implemented method of claim 1, wherein executing the interactive pipeline session further comprises:

receiving, from the client device, user input of computer-executable instructions in the integrated development environment; and executing the interactive pipeline session by using the computer-executable instructions to generate the data pipeline for the secure data in the integrated development environment.

9. A non-transitory computer-readable medium storing instructions that, when executed by at least one processor, cause a computer system to:

receive, from a client device, a request to initiate an interactive pipeline session within an integrated development environment that is connected to a data integration service;

based on the request to initiate the interactive pipeline session, generate, within the data integration service, a dedicated computing cluster to support the interactive pipeline session;

authenticate the dedicated computing cluster using a security credential service, wherein authenticating the dedicated computing cluster provides the dedicated computing cluster with access to secure data stored at a secure data source; and execute the interactive pipeline session by utilizing the dedicated computing cluster in the data integration service to generate a data pipeline for the secure data.

10. The non-transitory computer-readable medium of claim 9, further comprising instructions that, when executed by the at least one processor, cause the computer system to:

receive user input of computer-executable instructions from the client device in the integrated development environment; and based on receiving the user input, utilize a syncing utility to write the computer-executable instructions to the data integration service.

11. The non-transitory computer-readable medium of claim 10, further comprising instructions that, when executed by the at least one processor, cause the computer system to:

provide, for display in the integrated development environment on the client device, a rendering of computer-executable instructions; and based on detecting a termination of the interactive pipeline session, remove the computer-executable instructions from the client device.

12. The non-transitory computer-readable medium of claim 10, further comprising instructions that, when executed by the at least one processor, cause the computer system to:

determine, by an operations-monitoring utility, that the request to initiate the interactive pipeline session complies with interactive pipeline session configurations; and based on identifying that the request to initiate the interactive pipeline session meets the interactive pipeline session configurations, generate the dedicated computing cluster for the interactive pipeline session.

13. The non-transitory computer-readable medium of claim 10, further comprising instructions that, when executed by the at least one processor, cause the computer system to authenticate the dedicated computing cluster using the security credential service by:

providing a user authentication from the client device to the security credential service; and receiving, from the security credential service, a secure token that provides the data integration service access to a portion of the secured data during the interactive pipeline session based on a user role assigned to the client device in the secure data source.

14. The non-transitory computer-readable medium of claim 9, further comprising instructions that, when executed by the at least one processor, cause the computer system to:

receive, from an administrator device, a request to modify a user role corresponding with a user account associated with the client device, the user role defining user account access credentials to allow the user account to access data and services;

modify the user role to generate an updated user role associated with the user account; and wherein authenticating the dedicated computing cluster using the security credential service comprises granting the dedicated computing cluster the user account access credentials associated with the updated user role associated with the user account.

15. The non-transitory computer-readable medium of claim 9, further comprising instructions that, when executed by the at least one processor, cause the computer system to execute the interactive pipeline session by:

providing, within the integrated development environment, populated computer-executable instructions for generating the data pipeline;

generating the data pipeline based on receiving user input modifying the populated computer-executable instructions.

16. A system comprising:

at least one processor; and at least one non-transitory computer-readable storage medium storing instructions that, when executed by the at least one processor, cause the system to:

receive, from a client device, a request to initiate a interactive pipeline session within an integrated development environment that is connected to a data integration service;

based on the request to initiate the interactive pipeline session, generate, within the data integration service, a dedicated computing cluster to support the interactive pipeline session;

authenticate the dedicated computing cluster using a security credential service, wherein authenticating the dedicated computing cluster provides the dedicated computing cluster with access to secure data stored at a secure data source; and execute the interactive pipeline session by utilizing the dedicated computing cluster in the data integration service to generate a data pipeline for the secure data.

17. The system of claim 16, further comprising instructions that, when executed by the at least one processor, cause the system to:

receive user input of computer-executable instructions from the client device in the integrated development environment;

based on receiving the user input, utilize a syncing utility to write the computer-executable instructions to the data integration service;

providing, for display in the integrated development environment on the client device, a rendering of computer-executable instructions; and based on detecting a termination of the interactive pipeline session, removing the computer-executable instructions from the client device.

18. The system of claim 16, further comprising instructions that, when executed by the at least one processor, cause the system to:

determine, by an operations-monitoring utility, that the request to initiate the interactive pipeline session complies with interactive pipeline session configurations; and based on identifying that the request to initiate the interactive pipeline session meets the interactive pipeline session configurations, generate the dedicated computing cluster for the interactive pipeline session.

19. The system of claim 16, further comprising instructions that, when executed by the at least one processor, cause the system to authenticate the dedicated computing cluster using the security credential service by:

providing a user authentication from the client device to the security credential service; and receiving, from the security credential service, a secure token that provides the data integration service access to a portion of the secured data during the interactive pipeline session based on a user role assigned to the client device in the secure data source.

20. The system of claim 16, further comprising instructions that, when executed by the at least one processor, cause the system to execute the interactive pipeline session by:

providing, within the integrated development environment, populated computer-executable instructions for generating the data pipeline;

generating the data pipeline based on receiving user input modifying the populated computer-executable instructions.

* * * * *